United States Patent
Yuda et al.

(10) Patent No.: US 8,908,604 B2
(45) Date of Patent: Dec. 9, 2014

(54) WIRELESS COMMUNICATION APPARATUS AND WIRELESS COMMUNICATION METHOD

(75) Inventors: Yasuaki Yuda, Kanagawa (JP); Ayako Horiuchi, Kanagawa (JP); Seigo Nakao, Kanagawa (JP); Daichi Imamura, Kanagawa (JP); Atsushi Sumasu, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 166 days.

(21) Appl. No.: 13/638,701

(22) PCT Filed: Apr. 15, 2011

(86) PCT No.: PCT/JP2011/002240
§ 371 (c)(1),
(2), (4) Date: Oct. 1, 2012

(87) PCT Pub. No.: WO2011/135796
PCT Pub. Date: Nov. 3, 2011

(65) Prior Publication Data
US 2013/0028098 A1    Jan. 31, 2013

(30) Foreign Application Priority Data
Apr. 28, 2010 (JP) ................. 2010-104494

(51) Int. Cl.
*H04W 4/00* (2009.01)
(52) U.S. Cl.
USPC ................................................. 370/328
(58) Field of Classification Search
CPC ............... H04W 80/04; H04W 88/06
USPC ........................................................ 370/328
See application file for complete search history.

(56) References Cited

U.S. PATENT DOCUMENTS

| 2009/0323607 | A1 | 12/2009 | Park et al. | |
| 2010/0118798 | A1 | 5/2010 | Chun et al. | |
| 2010/0135159 | A1* | 6/2010 | Chun et al. | 370/241 |
| 2013/0272251 | A1* | 10/2013 | Schmidt et al. | 370/329 |

FOREIGN PATENT DOCUMENTS

| WO | 2008/114977 A1 | 9/2008 |
| WO | 2009/119477 A1 | 10/2009 |

OTHER PUBLICATIONS

3GPP TR 36.912 V9.0.0 (Sep. 2009) Feasibility study for Further Advancements for E-UTRA (LTE_Advanced).
3GPP TS 36.321 V8.5.0 (Mar. 2009) Evolved Universal Terrestrial Radio Access (E-UTRA) Medium Access Control (MAC) protocol specification.
3GPP TSG-RAN WG1 #59, Jeju, Korea, Nov. 2009, R1-095011, Ericsson, ST-Ericsson, Extended cell DTX for enhanced energy-efficient network operation.
International Search Report for PCT/JP2011/002240 dated May 24, 2011.

* cited by examiner

*Primary Examiner* — Ronald Abelson
(74) *Attorney, Agent, or Firm* — Pearne & Gordon LLP

(57) ABSTRACT

Provided are a wireless communication apparatus and a wireless communication method capable of reducing power consumption without delay of data transmission and reception. The wireless communication apparatus according to the invention includes a reception unit which receives a DRX instruction information destined for the wireless communication apparatus and a monitor process number including a sub-frame number used to monitor a PDCCH destined for the wireless communication apparatus; and a monitoring process unit which monitors the PDCCH destined for the wireless communication apparatus using only sub-frames set based on the sub-frame number, when receiving an instruction to perform a DRX process by the DRX instruction information.

13 Claims, 14 Drawing Sheets

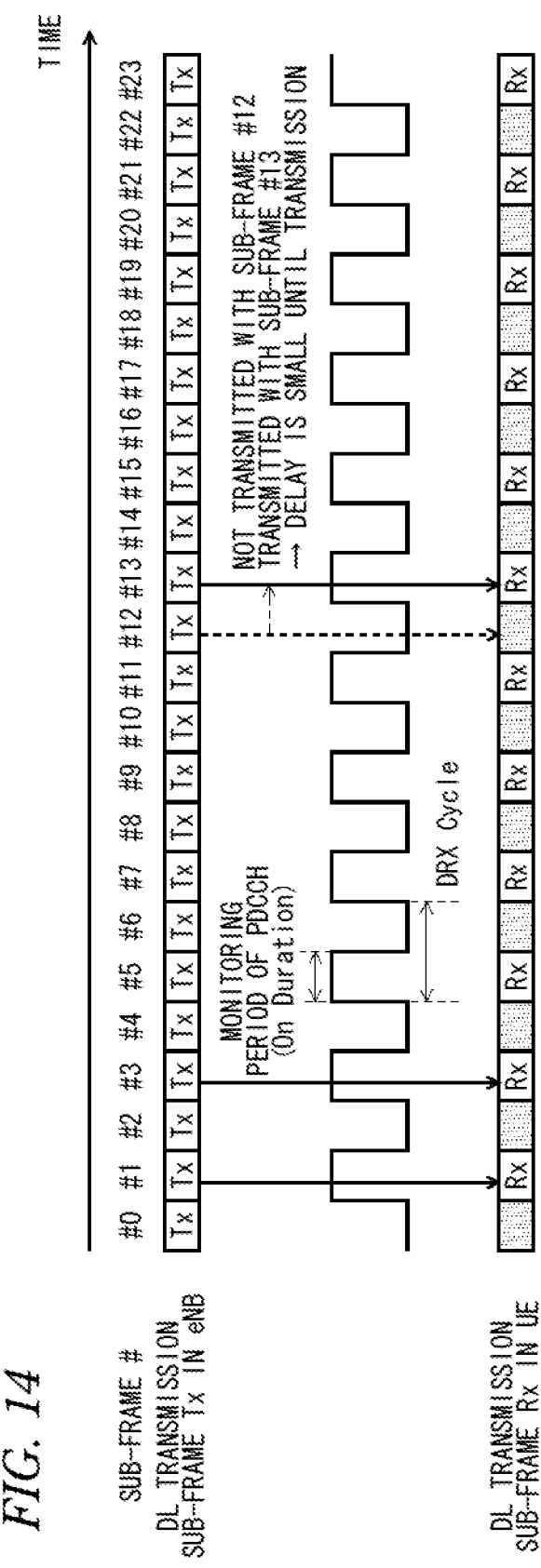

WIRELESS COMMUNICATION APPARATUS AND WIRELESS COMMUNICATION METHOD

TECHNICAL FIELD

The invention relates to a wireless communication apparatus and a wireless communication method.

BACKGROUND ART

The telecommunication international standardization body, 3GPP (3rd Generation Partnership Project), has completed the standardization of LTE (Long Term Evolution), which is the 3.9th generation telecommunication system, and currently is making progress in LTE-Advanced (LTE-A) adopting the LTE as the 4th generation telecommunication system. In the LTE-A, a relay technology of relaying radio signals using a relay station (Relay Node: RN) to expand a coverage and improve a capacity has been examined, as in NPL 1.

The relay technology in the LTE-A will be described in brief with reference to FIG. 11. FIG. 11 is a diagram illustrating a communication system using a relay technology. In FIG. 11 an eNB (evolved Node B) indicates a base station, an RN (Relay Node) indicates a relay station, and a UE (User Equipment) indicates a terminal. In FIG. 11, a UE1 indicates a terminal connected to the eNB and a UE2 indicates a terminal connected to the RN.

In the LTE-A, it has been examined whether a separate cell ID is also allocated to an RN, as in an eNB. Then, an RN can create one cell (relay cell), as in a cell (macro cell) created by an eNB. In the LTE-A, such a relay technology is called Type 1 Relay. The eNB is connected to a network in a wired communication manner and the RN is connected to the eNB in a wireless communication manner. A communication link connecting the RN and eNB to each other is called a backhaul link.

On the other hand, a communication link connecting the eNB and UE or the RN and UE is called an access link. In a downlink (DL), the RN receives a signal from the eNB using the backhaul link and transmits a signal to the UE2 using the access link of the RN. In an uplink, the RN receives a signal from the UE2 using the access link of the RN and transmits a signal to the eNB using the backhaul link. A relay technology using the backhaul link and the access link with the same frequency band is called in-band Relay in the LTE-A. In In-band Relay, when the RN transmits and receives signals at the same timing, interference may occur since the transmitted signal comes around to the received signal. Therefore, the RN may not transmit and receive signals at the same timing. Accordingly, in the LTE-A, a relay scheme of allocating timings of the backhaul link and the access link of the RN in a sub-frame unit has been examined.

Further, in the LTE-A, a technology of reducing power consumption in an eNB has been examined against the background of recent environmental problems. NPL 2 examines a method of reducing power consumption in an eNB by providing a time at which a signal is not transmitted from an eNB using a downlink. In an RN, it is also necessary to reduce power consumption due to the same reason. In addition to this, there is the following reason to reduce power consumption of an RN. That is, since there is a probability that the RN is driven by a battery, it is necessary to reduce the power consumption of the RN. From the viewpoint of the expansion of a coverage which is one of the objects of an RN, in regard to the installation place of an RN, it is considered that an RN is installed to relay radio waves of an eNB to a UE to which the radio waves do not arrive from the eNB. A mountain area and a vast plain area are examples of an area to which the radio waves do not arrive from the eNB. In this installation area, it is sometimes difficult to provide a power cable connected to the RAN. Therefore, it can be considered that the RN is driven by a battery.

Since a UE is originally driven by a battery, a discontinuous reception (DRX) technology of reducing reception power consumption of a UE is adopted in the LTE, as in NPL 3. In the DRX technology, the reception power consumption is designed to be reduced by providing a time at which a PDCCH (Physical Downlink Control Channel), which is a control channel of the downlink along which a signal is transmitted from an eNB, is not monitored in a UE.

The DRX technology of a UE in the LTE as a conventional DRX technology will be described in brief with reference to FIG. 12. FIG. 12 is a diagram illustrating a DRX technology of a UE in the LTE. In FIG. 12, an upper part shows DL transmission sub-frames Tx in an eNB and a lower part shows DL reception sub-frames Rx in a UE. Further, a middle part shows DRX Cycle and a PDCCH monitoring period in the UE.

First, the eNB notifies the UE, to which the DRX technology is applied, of a parameter which determines a DRX interval. Examples of the parameter which determines the DRX interval include DRX Cycle which is a repetition period of DRX and "On Duration Timer" which is a period in which the UE monitors the PDCCH transmitted by the eNB in DRX Cycle. Since the UE is notified of the parameter using an RRC signaling, a relatively long time is necessary until setting of the DRX is changed.

The UE performs the DRX based on the notified parameter. As shown in FIG. 12, the UE determines a PDCCH monitoring period (indicated by "On Duration" in FIG. 12) based on the notified parameter. The UE monitors the PDCCH transmitted from the eNB in the PDCCH monitoring period. In a period other than the PDCCH monitoring period, the UE does not monitor the PDCCH and interrupts a reception process. Thus, the reception power consumption can be reduced.

CITATION LIST

Non Patent Literature

[NPL 1] 3GPP TR36.912 v9.0.0 (2009-09)
[NPL 2] 3GPP R1-095011 (2009-11)
[NPL 3] 3GPP TS36.321 v8.5.0 (2009-03)

SUMMARY OF INVENTION

Technical Problem

In the LTE described above, the DRX of the UE is considered to be applied to the backhaul reception of the RN. That is, the eNB can notify the RN of a DRX parameter and the RN can perform the DRX based on the parameter.

Hereinafter, the DRX in a case in which generation frequency of transmission and reception data is high will be described with reference to FIGS. 13 and 14. FIG. 13 is a diagram illustrating an example (1) of the DRX of the RN when the generation frequency of transmission and reception data is high. FIG. 14 is a diagram illustrating an example (2) of the DRX of the RN when the generation frequency of transmission and reception data is high. In FIGS. 13 and 14, upper parts show DL transmission sub-frames (indicated by "eNB DL Tx" in FIGS. 13 and 14) in an eNB and lower parts show DL reception sub-frames (indicated by "UE UL Rx" in FIGS. 13 and 14) in the UE. Further, the middle parts show DRX Cycle and a PDCCH monitoring period in the UE.

In the example shown in FIG. 13, a period in which the RN does not monitor the PDCCH is long. When the period in which the RN does not monitor the PDCCH is long and transmission and reception data is generated in the period in which the RN does not monitor the PDCCH, delay is long until the RN is able to transmit and receive the data. For example, even when transmission and reception data is generated in sub-frame #12 in FIG. 13, the data is not able to be transmitted and received until sub-frame #21.

In the example shown in FIG. 14, a period in which the RN does not monitor the PDCCH is short. When the period in which the RN does not monitor the PDCCH is short and transmission and reception data is generated in the period in which the RN does not monitor the PDCCH, delay is short until the RN is able to transmit and receive the data. For example, when transmission and reception data is generated in sub-frame #12 in FIG. 14, the data is able to be transmitted and received in sub-frame #13. However, when the period in which the RN does not monitor the PDCCH becomes short, the number of times the RN monitors the PDCCH is increased per unit time of the sub-frame or the like. Accordingly, in the reception process of the RN, the power consumption may increase.

Thus, when the generation frequency of transmission and reception data is high and the period in which the RN does not monitor the PDCCH is set to be long, the delay may be long until the data generated in the period in which the RN does not monitor the PDCCH is able to be transmitted and received. Conversely, when the period in which the RN does not monitor the PDCCH is set to be short in order to increase chances to transmit and receive data, a problem may arise in that the advantage of reducing the power consumption of the RN decreases.

An object of the invention is to provide a wireless communication apparatus and a wireless communication method capable of reducing power consumption without delay of data transmission and reception.

Solution to Problem

According to one aspect of the present invention, there is provided a wireless communication apparatus comprising:
a reception unit configured to receive discontinuous reception (DRX) instruction information for the wireless communication apparatus and a monitor process index including a sub-frame index used to monitor a PDCCH for the wireless communication apparatus; and
a monitoring process unit configured to monitor the PDCCH for the wireless communication apparatus using only a sub-frame which is set based on the sub-frame index, when receiving an instruction to perform a DRX process by the DRX instruction information In the above described wireless communication apparatus, the set sub-frame may be a sub-frame distributed in a frame.

In the above described wireless communication apparatus, the set sub-frame may be set based on the sub-frame index and a sub-frame used for an HARQ process.

In the wireless communication apparatus, the set sub-frame may be set based on the sub-frame index and a sub-frame used for synchronous HARQ process in which a time interval from transmission time of new data to transmission time of retransmission data is fixed.

In the above described wireless communication apparatus, when the set sub-frame is not able to be set as a backhaul sub-frame, the monitoring process unit may be configured to change the time interval from the transmission time of the new data to the transmission time of the retransmission data and may monitor the PDCCH for the wireless communication apparatus.

In the above described wireless communication apparatus, when the wireless communication apparatus communicates with a communication partner apparatus using asynchronous HARQ process in which a time interval from transmission time of new data to transmission time of retransmission data is variable within a determined range and when the wireless communication apparatus is instructed to perform the DRX process by the DRX instruction information, the monitoring process unit configured to switch to communication performed using synchronous HARQ process in which a time interval from transmission time of new data to transmission time of retransmission data may be fixed and may monitor the PDCCH for the wireless communication apparatus.

In the above described wireless communication apparatus, when the monitoring process unit detects the PDCCH for the wireless communication apparatus by monitoring continuous sub-frames, the monitoring process unit may monitor the PDCCH for the wireless communication apparatus using only a sub-frame corresponding to the detected PDCCH.

A relay station apparatus may comprise:
the above described wireless communication apparatus.

According to another aspect of the present invention, there is provided a wireless communication apparatus comprising:
a scheduling unit configured to perform scheduling on data of a downlink based on discontinuous reception (DRX) instruction information for a communication partner apparatus and a monitor process index including a sub-frame index of the downlink used for the communication partner apparatus to monitor a PDCCH; and
a transmission unit configured to transmit the PDCCH to the communication partner apparatus using only a sub-frame of the downlink based on the DRX instruction information for the communication partner apparatus, the monitor process index, and the scheduling by the scheduling unit.

In the above described wireless communication apparatus, when the wireless communication apparatus communicates with the communication partner apparatus using asynchronous HARQ process in which a time interval from transmission time of new data to transmission time of retransmission data is variable within a determined range and when the wireless communication apparatus transmits the retransmission data of the downlink in which an error occurs, the scheduling unit may transmit the retransmission data of the downlink after determined sub-frames since the timing of receiving a notification indicating that the error occurs from the communication partner apparatus.

A base station apparatus may comprise:
the above described wireless communication apparatus.

According to still another aspect of the present invention, there is provided a wireless communication method comprising:
receiving discontinuous reception (DRX) instruction information for a wireless communication apparatus and a monitor process index including a sub-frame index used to monitor a PDCCH for the wireless communication apparatus; and
monitoring the PDCCH for the wireless communication apparatus using only a sub-frame which is set based on the sub-frame index, when receiving an instruction to perform a DRX process by the DRX instruction information.

According to yet still another aspect of the present invention, there is provided a wireless communication method comprising:

performing scheduling on data of a downlink based on discontinuous reception (DRX) instruction information for a communication partner apparatus and a monitor process index including a sub-frame index of the downlink used for the communication partner apparatus to monitor a PDCCH; and transmitting the PDCCH to the communication partner apparatus using only a sub-frame of the downlink based on the DRX instruction information, the monitor process index, and the scheduling.

Advantageous Effects of Invention

In the wireless communication apparatus and the wireless communication method according to the aspects of the invention, the power consumption can be reduced without delay of data transmission and reception.

BRIEF DESCRIPTION OF DRAWINGS

FIG. 14 is a diagram illustrating an example (2) of the DRX of an RN when the generation frequency of transmission and reception data is high.

DESCRIPTION OF EMBODIMENTS

Hereinafter, embodiments of the invention will be described with reference to the drawings.

First Embodiment

Figure 13:
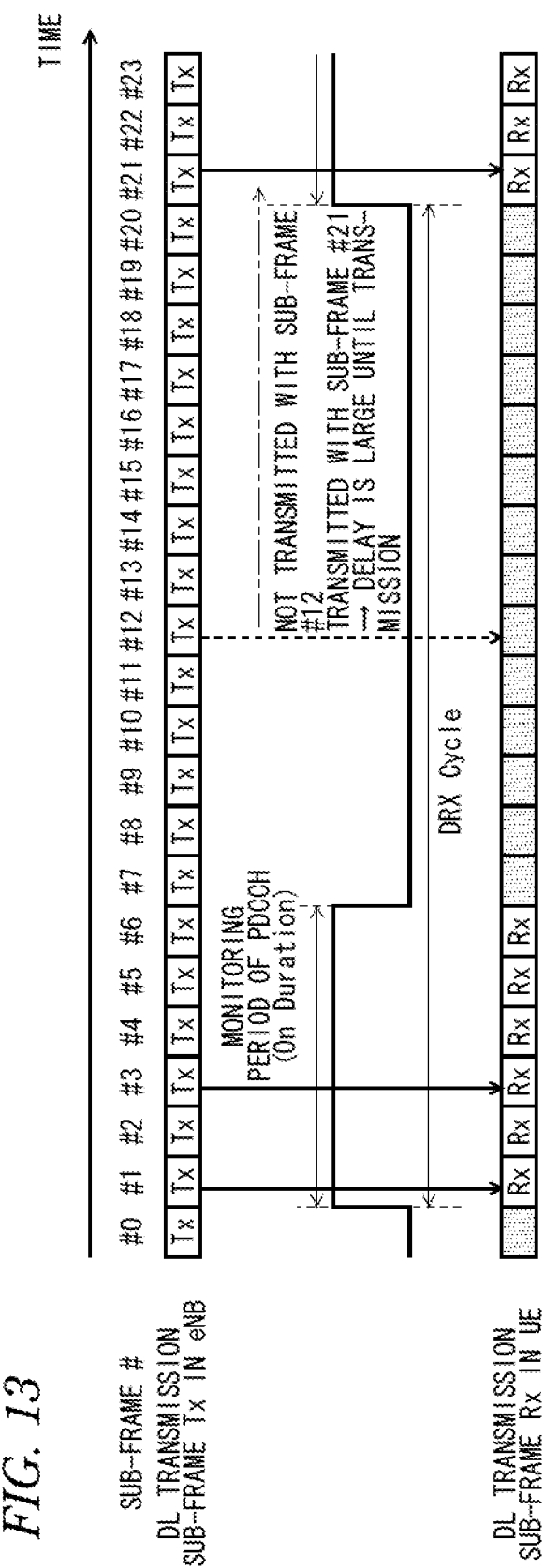
FIG. 13 is a diagram illustrating an example (1) of the DRX of an RN when generation frequency of transmission and reception data is high.

When generation frequency of transmission and reception data is high in an RN and a time in which the data is not able to be successively transmitted continues, as described with reference to FIGS. 13 and 14, the RN is not able to transmit and receive the data generated in this time. Therefore, delay occurs until the data is able to be transmitted and received next time. Conversely, when a time in which data is able to be transmitted and received in the RN is dispersed, the delay for the generated data can be decreased in case that the generation frequency of transmission and reception data is high. Therefore, when the generation frequency of transmission and reception data is high and the DRX is applied to the RN, the delay until the transmission and the reception of the data can be further decreased in the RN by causing the RN to monitor the PDCCH in a dispersive manner than by causing the RN to continuously monitor the PDCCH.

Here, HARQ of the LTE will be considered. In HARQ of the LTE, the concept, a process, is used to manage transmission data. A number is granted to each process. When an error occurs in transmission data, retransmission data is transmitted using the same process index as the process index of the data in which the error has occurred, and thus the transmission data and retransmission data can be synthesized on a reception side.

The specific description will be made below. A transmission side transmits new data using a given process index and the reception side receives the new data. The reception side determines that an error occurs in the received data and consequently notifies the transmission side of Ack/Nack at a predetermined timing. When the transmission side is notified of the fact that no error has occurred as the error determination result (that is, the reception side notifies the transmission side of Ack), the transmission side transmits new data with respect to the previous process index.

Conversely, when the transmission side is notified of the fact that an error has occurred (that is, the reception side notifies the transmission side of Nack), the transmission side transmits retransmission data with respect to the previous process index. In regard to a transmission timing of the retransmission data, a retransmission method of transmitting the retransmission data at a predetermined timing after receiving the fact that an error has occurred is referred to as a synchronous HARQ. On the other hand, a retransmission method of transmitting the retransmission data at any timing within a predetermined range after the predetermined timing is referred to as an asynchronous HARQ.

A time length from transmission of new data to transmission of retransmission data is referred to as a RTT (Round Trip Time). The RTT is a fixed value in the synchronous HARQ. The RTT is a variable value within a predetermined range in the asynchronous HARQ. In the LTE, the synchronous HARQ is used in a UL and the asynchronous HARQ is used in a DL.

In the LTE, either allocation information (DL assignment) of the DL data or assignment information (UL grant) is transmitted from the eNB to the UE using the PDCCH. The UE needs to monitor the PDCCH in order to detect the assignment information of the DL data and the assignment information of the UL for the UE itself.

Here, when the synchronous HARQ is focused on, a sub-frame timing for each process is determined in the process of the synchronous HARQ. Therefore, in the process of the synchronous HARQ, the sub-frame timing at which the PDCCH is monitored is uniquely determined for each process. Accordingly, in the synchronous HARQ, when the process is restricted, the PDCCH to be monitored can be restricted. That is, the transmission side, the reception side, or both sides can control the sub-frames for the PDCCH is monitored for each process. Further, the process of the synchronous HARQ is repeated at the fixed RTT. Therefore, by restricting the process, the sub-frames for which the PDCCH is monitored can be distributed. An HARQ process includes the synchronous HARQ and the asynchronous HARQ described above.

In the first embodiment, in the DRX method of the RN, (1) the eNB sets the UL process in which the (A) the RN monitors the PDCCH and the UL process in which the RN does not monitor the PDCCH in the synchronous HARQ process of the backhaul UL and notifies the RN of the UL process in which the RN monitors the PDCCH, and (2) the RN monitors only the PDCCH of the sub-frame which corresponds to the UL process in which the PDCCH is monitored and with which the PDCCH is transmitted.

Figure 1:
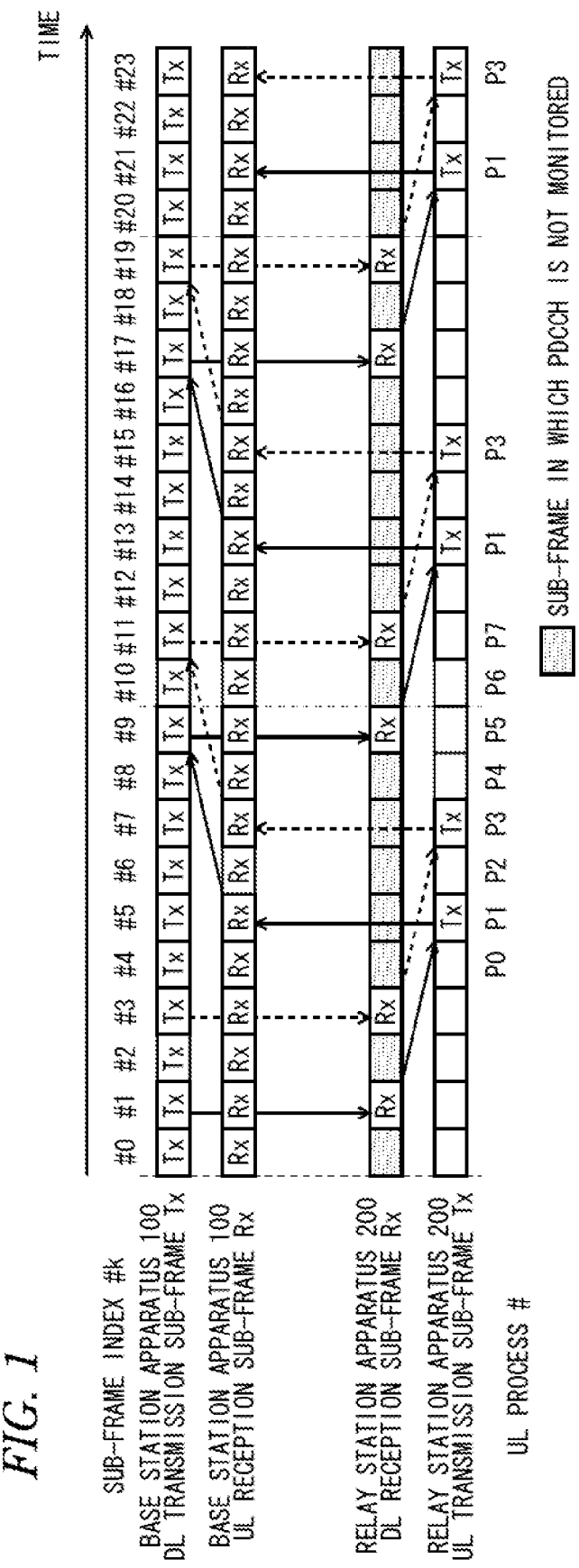
FIG. 1 is a diagram illustrating a DRX method according to a first embodiment.

The DRX method according to the first embodiment will be described with reference to FIG. 1. FIG. 1 is a diagram illustrating the DRX method according to the first embodiment. FIG. 1 shows data exchange in a backhaul link, that is, communication between the base station apparatus (eNB) 100 and the relay station apparatus (RN) 200 at the DRX time.

Here, in FIG. 1, each box represents a sub-frame and the horizontal axis represents a time. The sub-frames in two upper stages indicate a DL transmission sub-frame Tx and a UL reception sub-frame Rx in the base station apparatus 100. The sub-frames in two lower stages indicate a DL reception sub-frame Rx and a UL transmission sub-frame Tx in the relay station apparatus 200.

In FIG. 1, in the DL reception sub-frames in the relay station apparatus 200, a given sub-frame written by Rx indicates a sub-frame in which the PDCCH is monitored in the relay station apparatus 200. In the DL reception sub-frames in the relay station apparatus 200, a sub-frame drawn by a dotted line indicates a sub-frame in which the PDCCH is not monitored in the relay station apparatus 200.

On the other hand, in the UL transmission sub-frames in the relay station apparatus 200, a given sub-frame denoted by Tx indicates a sub-frame in which a UL backhaul is transmitted to the base station apparatus 100 in the relay station apparatus 200. In the UL transmission sub-frames in the relay station apparatus 200, a blank sub-frame indicates a sub-frame in which the UL backhaul is not transmitted. A UL synchronous HARQ process index Pk (where k=0, 1, 3, . . . : where k is a positive integer) is shown below the UL reception sub-frames. Hereinafter, a process corresponding to the UL synchronous HARQ process index Pk is referred to as "Process k (where k=0, 1, 3, . . . : where k is a positive integer)."

The base station apparatus 100 first sets "the UL process monitored by the relay station apparatus 200" in the DRX of the relay station apparatus 200. In FIG. 1, Process 1 (denoted by P1 in FIG. 1) and Process 3 (denoted by P3 in FIG. 1) are "the UL processes monitored by the relay station apparatus 200." Next, the base station apparatus 100 notifies the relay station apparatus 200 of an instruction to perform the DRX and the process indexes (P1 and P3).

Then, the relay station apparatus 200 monitors only "the PDCCH of a sub-frame in which the PDCCH corresponding to the process index reported from the base station apparatus 100" as the process at the DRX time. In FIG. 1, the PDCCH corresponding to Process 1 (P1) is the PDCCH transmitted in sub-frame #1 from the base station apparatus 100. The PDCCH corresponding to Process 3 (P3) is the PDCCH transmitted in sub-frame #3 from the base station apparatus 100. Thus, the relay station apparatus 200 monitors the PDCCH of sub-frame #1 and the PDCCH of sub-frame #3. However, the RN does not monitor the PDCCHs of the sub-frames of sub-frames #0, #2, and #4 to 7.

Here, the fact that the relay station apparatus monitors the PDCCH means that the relay station apparatus receives the corresponding sub-frame and the relay station apparatus detects the PDCCH for the relay station apparatus itself. Further, the fact that the relay station apparatus does not monitor the PDCCH means that the relay station apparatus does not receive the corresponding sub-frame and does not consequently detect the PDCCH for the relay station apparatus itself.

The base station apparatus 100 transmits the PDCCH to the relay station apparatus 200 using the sub-frame monitored by the relay station apparatus 200. In FIG. 1, the base station apparatus 100 transmits the PDCCH to the relay station apparatus 200 using sub-frame #1 and sub-frame #3. The POOCH includes the assignment information (DL assignment) regarding the DL data transmitted from the base station apparatus 100 to the relay station apparatus 200 and the assignment information (UL grant) regarding the UL data transmitted from the relay station apparatus 200 to the base station apparatus 100.

In the LTE, the DL data is transmitted with the same sub-frame as that in which the assignment information (DL assignment) regarding this DL data is transmitted. In FIG. 1, the DL data is transmitted only with sub-frame #1 and sub-frame #3.

When the relay station apparatus 200 detects the POOCH for the relay station apparatus itself among the monitored PDCCHs, the relay station apparatus 200 performs a process based on the contents of the detected PDCCH. Further, when the relay station apparatus 200 detects the assignment information (DL assignment) regarding the DL data included in the POOCH from the monitored PDCCH, the relay station apparatus 200 receives the DL data transmitted with the same sub-frame based on the assignment information.

When the relay station apparatus 200 detects the assignment information (UL grant) regarding the UL data from the monitored PDCCH, the relay station apparatus 200 transmits the UL sub-frame among predetermined UL sub-frames to the base station apparatus 100. In the LTE, the relay station apparatus 200 transmits the UL data after four sub-frames since the timing of receiving the PDCCH.

According to "the DRX method of the relay station apparatus 200" described with reference to FIG. 1, the DRX can be set without reducing the changes of the transmission and reception in the relay station apparatus 200. Therefore, the power consumption can be reduced without the large delay of the data transmission and reception.

According to "the DRX method of the relay station apparatus 200" described with reference to FIG. 1, the relay station apparatus 200 does not transmit the UL in the processes (P0, P2, and P4 to P7) for which the PDCCH is not monitored. Therefore, it is possible to obtain only the advantage of reducing the power consumption at the reception time by the DRX but also the advantage of reducing transmission power.

Figure 2:
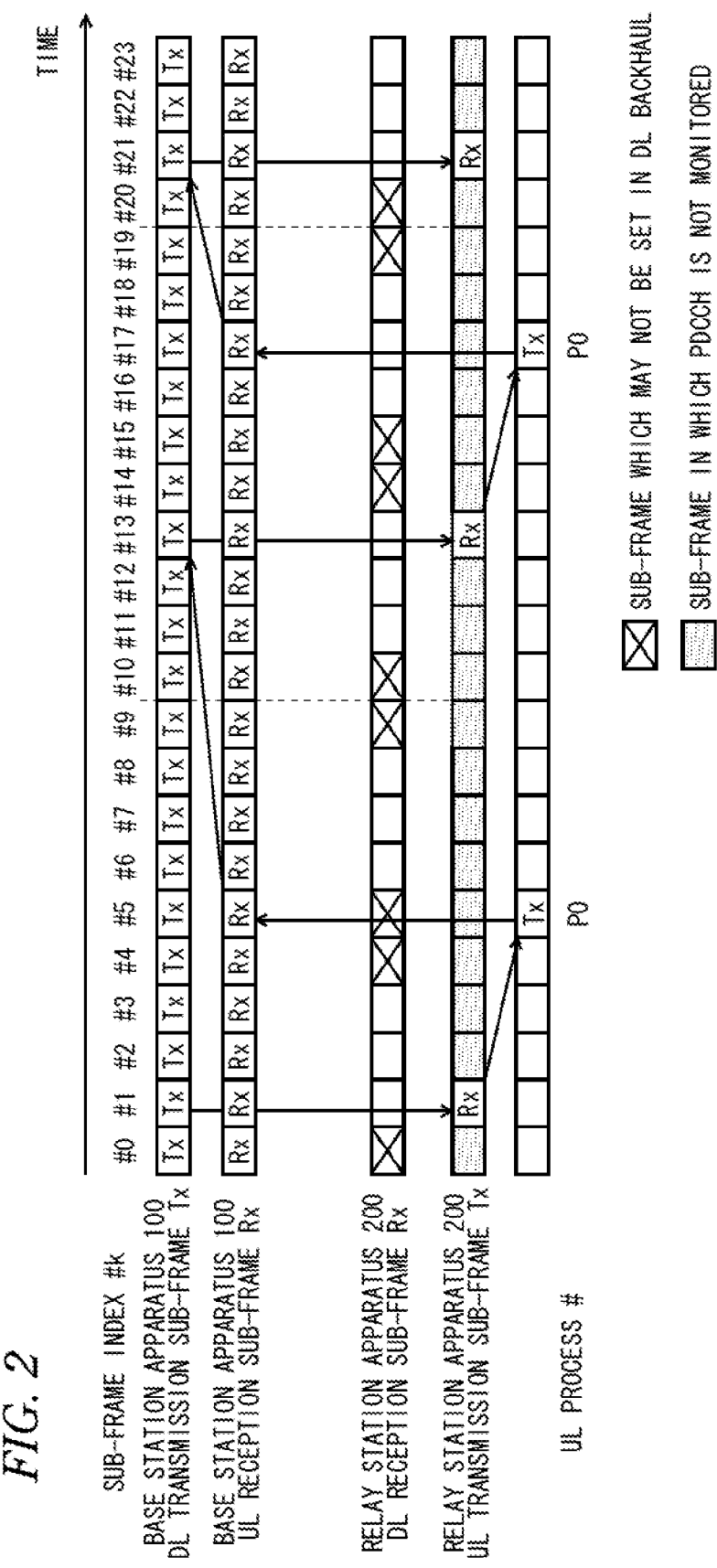
FIG. 2 is a diagram illustrating a restriction on a sub-frame which can be set in a backhaul.

In Relay of the LTE-A, there is a restriction on a sub-frame which can be set in a backhaul which is the communication between the base station apparatus 100 and the relay station apparatus 200. The restriction on a sub-frame which can be set in the backhaul is shown in FIG. 2. FIG. 2 is a diagram illustrating the restriction on a sub-frame which can be set in the backhaul.

As shown in FIG. 2, the sub-frame numbers 0, 4, 5, and 9 in the DL, sub-frame #0, #4, #5, and #9 are configured not to be set as backhaul sub-frames. Therefore, the sub-frames which can be set in the DL backhaul are restricted to the sub-frame numbers 1, 2, 3, 6, 7, and 8, sub-frames #1, #2, #3, #6. #7, and #8.

The restriction on the backhaul sub-frames described with reference to FIG. 2 is configured at a period of ten sub-frames. On the other hand, the RTT which is an interval from new data to retransmission data in the UL synchronous HARQ is eight sub-frames. Thus, since the period of the backhaul sub-frames is different from the period of the RTT in the UL, HARQ does not sometimes operate in the sub-frames with which the assignment information (UL grant) of the UL data may not be transmitted.

On the other hand, it has been examined that the period of the RTT in the UL is determined within a process or is changed for each process. For example, FIG. 2 shows a case in which the period of the RTT of a process of a UL is eight sub-frames or twelve sub-frames. Thus, when the RTT is different in a process of the UL synchronous HARQ, each process used for the relay station apparatus 200 to monitor the PDCCH and each process used for the relay station apparatus 200 not to monitor the PDCCH can be set by uncomplicated control, and therefore compatibility can be said to be good.

Figure 3:
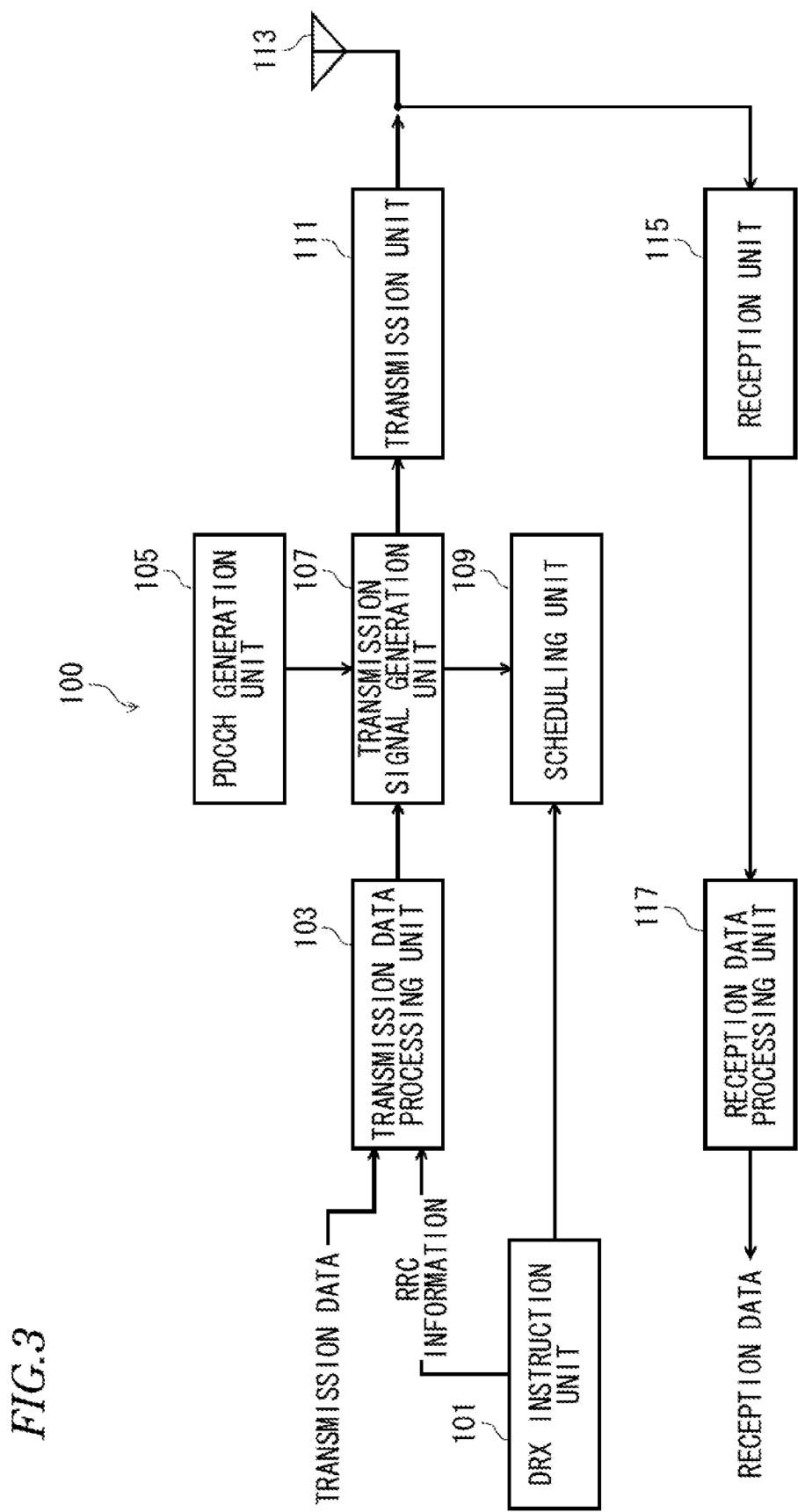
FIG. 3 is a block diagram illustrating the configuration of a base station 100.

Next, the configuration of the base station apparatus (eNB) 100 will be described with reference to FIG. 3. FIG. 3 is a block diagram illustrating the configuration of the base station apparatus 100. As shown in FIG. 3, the base station apparatus 100 includes a DRX instruction unit 101, a transmission data processing unit 103, a PDCCH generation unit 105, a transmission signal generation unit 107, a scheduling unit 109, a transmission unit 111, an antenna 113, a reception unit 115, and a reception data processing unit 117.

Transmission data is data which is transmitted to the relay station apparatus (RN) 200 along a downlink and is input to the transmission data processing unit 103.

RRC information is one of the control information of which the base station apparatus itself notifies the relay station apparatus 200. In this embodiment, the RRC information includes DRX instruction information and a monitor process index. The RRC information is output together with the transmission data to the transmission data processing unit 103.

The DRX instruction unit 101 gives the DRX instruction information to the relay station apparatus 200 when the relay station apparatus 200 performs a DRX process and gives the monitor process index used to monitor the PDCCH when the relay station apparatus 200 performs the DRX process. Through the RRC information, the relay station apparatus 200 is notified of the DRX instruction information and the monitor process index for the relay station apparatus 200. The relay station apparatus 200 may be notified of the DRX instruction information and the monitor process index at the same timing or the relay station apparatus 200 may be notified at different timings. As a method of notifying the relay station apparatus 200 of the DRX instruction information and the monitor process index at different timings, for example, a method of causing the base station apparatus 100 to notify the relay station apparatus 200 of the monitor process index in advance and causing the base station apparatus 100 to notify the relay station apparatus 200 of the DRX instruction information when the relay station apparatus 200 performs the DRX can be used.

The transmission data processing unit 103 performs transmission processes, such as an encoding process and a modulating process, on the transmission data and the RRC information. The transmission data subjected to the transmission processes is output to the transmission signal generation unit 107.

The PDCCH generation unit 105 generates the PDCCH. The PDCCH includes assignment information of DL data and assignment information of UL data. Each assignment information includes resource assignment information, which is a result obtained through scheduling of the scheduling unit 109, and MCS information of data. The generated PDCCH is output to the transmission signal generation unit 107.

The transmission signal generation unit 107 generates a transmission signal from the transmission data subjected to the transmission processes, the PDCCH, or the like based on the scheduling result obtained from the scheduling unit 109. As the process of generating the transmission signal, in the example of the LTE, a method of multiplexing the transmission data and the PDCCH and performing OFDM can be performed. The generated transmission signal is output to the transmission unit 111.

The scheduling unit 109 performs scheduling on the DL data and the UL data. The scheduling unit 109 separately performs the scheduling on the DL data and the UL data based on link quality information or the like (not shown) and outputs the scheduling result to the transmission signal generation unit 107. At this time, the scheduling unit 109 performs the scheduling based on the DRX instruction information and the monitor process index output from the DRX instruction unit 101. In regard to the relay station apparatus 200 instructed by the DRX instruction information from the DRX instruction unit 101, the base station apparatus 100 performs the scheduling for the relay station apparatus 200 only on "the sub-frame with which the PDCCH" corresponding to the monitor process index in the relay station apparatus 200.

The transmission unit 111 performs wireless transmission processes on the transmission signal generated by the transmission signal generation unit 107. As the wireless transmission processes, for example, a process of converting the input transmission signal into analog signal, a process of amplifying transmission power, a filtering process, and a frequency converting process can be performed. The transmission signal subjected to the wireless transmission processes is transmitted from the antenna 113.

The reception unit 115 performs wireless reception processes on a signal transmitted from a communication partner and received by the antenna 113. As the wireless reception processes, for example, a frequency converting process and a filtering process are performed. The reception signal subjected to the wireless reception processes is output to the reception data processing unit 117.

The reception data processing unit 117 performs reception processes on the reception signal on which the reception unit 115 performs the wireless reception processes. As the reception processes, for example, a process of converting the input signal into a digital signal, a demodulating process, and a decoding process can be performed. The data subjected to the reception processes is the reception data.

Figure 4:
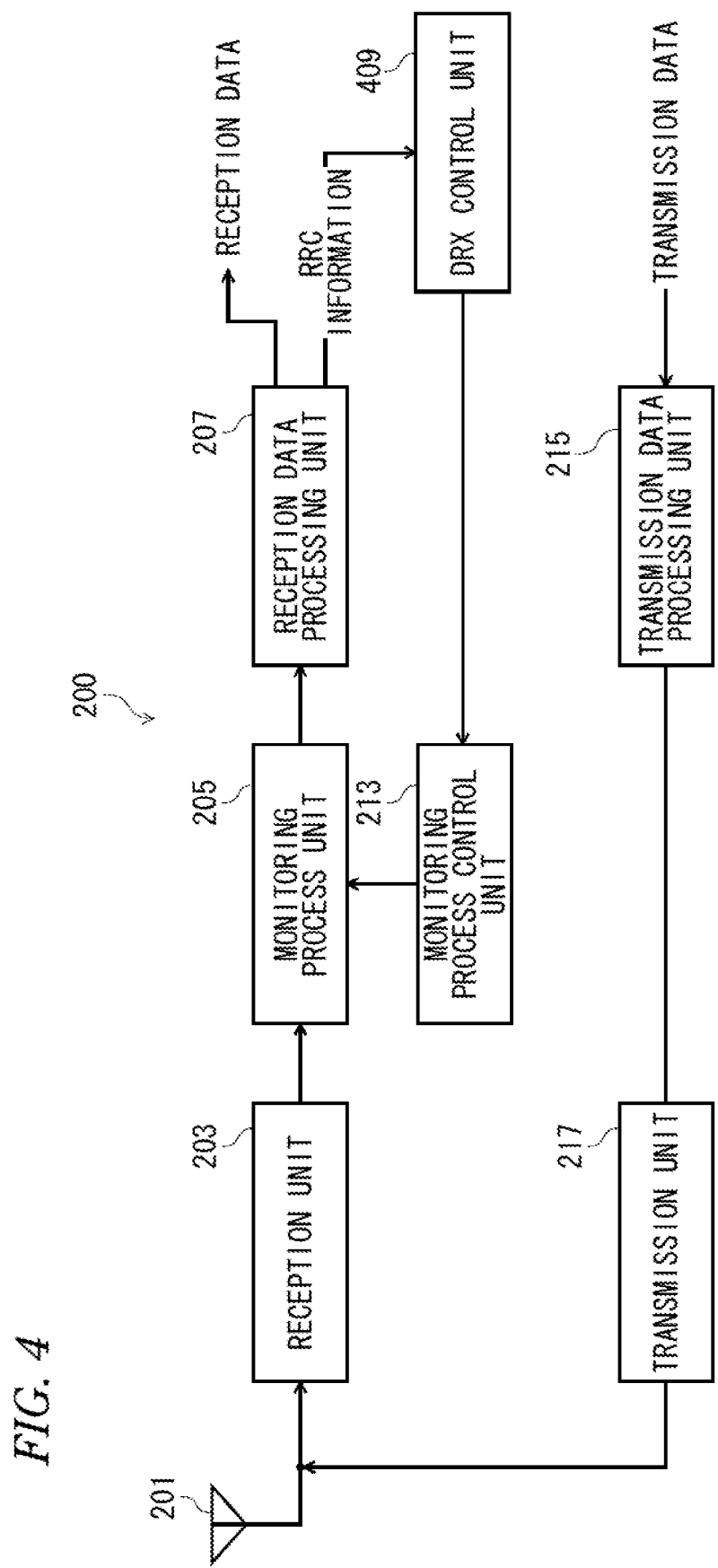
FIG. 4 is a block diagram illustrating the configuration of a relay station 200.

Next, the configuration of the relay station apparatus (RN) 200 will be described with reference to FIG. 4. FIG. 4 is a block diagram illustrating the configuration of the relay station apparatus 200. As shown in FIG. 4, the relay station apparatus 200 includes an antenna 201, a reception unit 203, a monitoring process unit 205, a reception data processing unit 207, a DRX control unit 209, a monitoring process control unit 213, a transmission data processing unit 215, and a transmission unit 217.

The reception unit 203 performs wireless reception processes on the signal transmitted from the base station apparatus (eNB) 100 and received by the antenna 201. As the wireless reception processes, for example, a frequency converting process and a filtering process can be performed. The reception signal subjected to the wireless reception processes is output to the monitoring process unit 205.

The monitoring process unit 205 detects whether the reception signal subjected to the wireless reception processes includes the PDCCH for the relay station apparatus itself based on an instruction of the monitoring process control unit 213. When the monitoring process unit 205 detects the PDCCH for the relay station apparatus itself, the monitoring process unit 205 outputs the detected PDCCH and the reception signal to the reception data processing unit 207.

The reception data processing unit 207 performs a demodulating process, a decoding process, and the like on the reception signal based on the PDCCH for the relay station apparatus itself output from the monitoring process unit 205. The data subjected to the reception processes are the reception data and the RRC information. The reception data is data which is transmitted from the base station apparatus (eNB) 100 to the relay station apparatus itself along the DL. The RRC information is RRC information transmitted from the base station apparatus (eNB) 100 to the relay station apparatus itself along the DL. The RRC information includes the DRX instruction information and the monitor process index.

The DRX control unit 209 stores the monitor process index of which the base station apparatus (eNB) 100 notifies the relay station apparatus 200 by the RRC information. Further, when the base station apparatus (eNB) 100 instructs the relay station apparatus itself to perform the DRX process by the RRC information, the DRX control unit 209 outputs the monitor process index to the monitoring process control unit 213 to instruct the monitoring process control unit 213 to perform the DRX process.

When the monitoring process control unit 213 receives the instruction to perform the DRX process from the DRX control unit 209, the monitoring process control unit 213 detects the sub-frame number used to monitor the PDCCH from the monitor process index output from the DRX control unit 209 and instructs the monitoring process unit 205 to monitor the PDCCH in the detected sub-frame number used to monitor the PDCCH.

The transmission data is data which is transmitted from the relay station apparatus itself to the base station apparatus (eNB) 100 along the UL.

The transmission data processing unit 215 performs transmission processes, such as an encoding process and a modulating process, on the transmission data.

The transmission unit 217 performs wireless transmission processes on the data subjected to the transmission processes. As the wireless transmission processes, for example, a process of converting the input transmission signal into an analog signal, a process of amplifying transmission power, and a frequency converting process can be performed. The transmission signal subjected to the wireless transmission processes is transmitted from the antenna 201.

In this embodiment, the DRX method in the relay station apparatus has been described. However, the DRX method is not limited to the relay station apparatus, but may be also applied to the UE (terminal apparatus). In this case, this DRX method can be used together with the DRX method of the LTE described in the conventional method.

In this embodiment, the case has been described in which the DRX method of this embodiment is applied to the relay station apparatus switching the backhaul link and the access link with respect to the time axis (sub-frame unit), but the invention is not limited thereto. The DRX method of this embodiment may be applied to a relay station apparatus which switches the backhaul link and the access link with respect to a frequency axis.

When the DRX is performed, the number of processes monitored in the relay station apparatus may be changed without notification of the RRC information from the base station apparatus to the relay station apparatus. For example, the following method may be used. The relay station apparatus monitors the PDCCH corresponding to the monitored process to detect whether the PDCCH for the relay station apparatus itself is present. The monitored PDCCH may not necessarily be the PDCCH for the relay station apparatus itself.

Accordingly, the number of processes to be monitored is set to be small. When the PDCCH for the relay station apparatus itself is detected, the number of processes used for the relay station apparatus to monitor the PDCCH may be increased. Thus, when no data to be transmitted and received is present, the number of processes used for the relay station apparatus to monitor the PDCCH can be decreased, so that the reception power consumption is reduced.

Conversely, when data to be transmitted and received is present, the number of processes used for the relay station apparatus to monitor the PDCCH can be increased so that the delay occurring due to the restriction on the number of processes is suppressed. The POOCH for the relay station apparatus itself includes the assignment information (DL assignment) regarding the DL data and the assignment information (UL grant) regarding the UL data.

In the POOCH monitored by the relay station apparatus, when the amount of data equal to or greater than a predetermined amount of data is transmitted in the assignment information (DL assignment) regarding the DL data, the number of processes used for the relay station apparatus to monitor the PDCCH may be increased. Thus, when the amount of data equal to or greater than the predetermined amount of data is transmitted, the amount of data transmitted from the base station apparatus is considered to be considerable, and therefore abundant data can be transmitted by increasing the number of processes. Accordingly, the delay occurring due to the restriction on the number of processes can be suppressed.

The relay station sometimes notifies base station apparatus of the data transmitted with the UL and indicating how much data is transmitted by the relay station apparatus. When the base station apparatus is notified of the amount of data equal to or greater than a predetermined amount of data, the number of processes to be monitored may be increased. Thus, when the amount of data equal to or greater than the predetermined amount of data is accumulated in the relay station apparatus, the number of processes can be increased, so that abundant amount can be transmitted. Accordingly, the delay occurring due to the restriction on the number of processes can be suppressed.

When the data transmitted and received in the relay station apparatus is data relayed between the UE (terminal apparatus) and the base station apparatus, the number of processes has been increased. However, the number of processes may not be increased for the data communicated between the relay station apparatus and the base station apparatus. The amount of data between the base station apparatus and the UE sometimes becomes large. On the other hand, the data communicated between the relay station apparatus and the base station apparatus is control information, and thus the amount of data is sometimes small. In this case, when data is data communicated between the base station apparatus and the UE, the large amount of data can be configured to be transmitted by increasing the number of processes. Thus, the delay occurring due to the restriction on the number of processes can be suppressed.

When the DRX is performed, the following may be restricted in addition to the process used for the relay station apparatus to monitor the PDCCH. The relay station apparatus monitors whether the PDCCH for the relay station apparatus itself is not present in the sub-frame with which the PDCCH corresponding to the process to be monitored. In the LTE, when the PDCCH is monitored, the PDCCH for the relay station apparatus itself is searched by blind determination. An area subjected to the blind determination is referred to as a search space. A different search space is allocated to each terminal. Accordingly, when the DRX is performed, the search space can be restricted. Thus, since it is possible to reduce the number of times the blind determination is performed, the reception power consumption can be reduced.

The search space includes not only the search space for individual terminal but also a common search space monitored by all of the terminals. When the DRX is performed, a sub-frame for which the common search space is not monitored may be provided. Accordingly, when the amount of traffic is relatively small, the DRX is performed, and thus the reception power consumption can be reduced. In this case, since the sub-frames with which a transmission side transmits common information reported in the common search space can be restricted, the sub-frames used for a reception side to monitor the common search space may be said to be restricted. Thus, since it is possible to reduce the number of sub-frames used to monitor the common search space, the reception consumption power can be reduced.

Second Embodiment

In the LTE, asynchronous HARQ is used as HARQ of the DL. In the asynchronous HARQ, when an error occurs in transmission data, retransmission data is transmitted at any timing after a predetermined time from a timing at which a transmission side receives a retransmission request signal (Nack in the LTE) from a reception side. In the DL of the LTE, the retransmission data is transmitted with any sub-frame after a predetermined time after an eNB receives Nack.

In the first embodiment, when the asynchronous HARQ is performed in a situation in which a sub-frame with which the PDCCH is transmitted to the relay station apparatus 200 is determined in advance, the sub-frames which can be transmitted are restricted. Therefore, since there is a probability that a time until transmission of the retransmission data may be lengthened, a delay problem may occur.

In a second embodiment, however, when the processes used to monitor the PDCCH are restricted, the delay can be prevented from occurring by changing the asynchronous HARQ of the DL to the HARQ (synchronous HARQ) in which the RTT is fixed.

Figure 5:
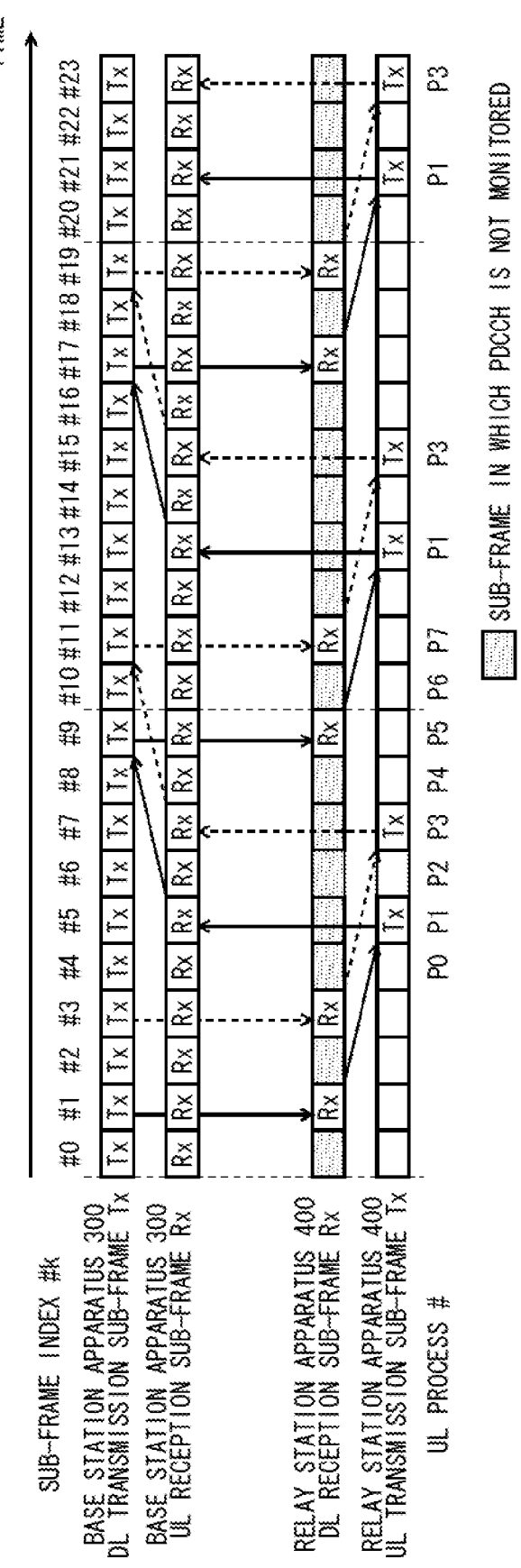
FIG. 5 is a diagram illustrating a DRX method according to a second embodiment.

A DRX method according to a second embodiment will be described with reference to FIG. 5. FIG. 5 is a diagram illustrating the DRX method according to the second embodiment. FIG. 5 shows data exchange in a backhaul link, that is, communication between the base station apparatus (eNB) 300 and the relay station apparatus (RN) 400 at the DRX time.

Here, in FIG. 5, each box represents a sub-frame and the horizontal axis represents a time. The sub-frames in two upper stages indicate a DL transmission sub-frame Tx and a UL reception sub-frame Rx in the base station apparatus 300. The sub-frames in two lower stages indicate a DL reception sub-frame Rx and a UL transmission sub-frame Tx in the relay station apparatus 400.

In FIG. 5, in the DL reception sub-frames in the relay station apparatus 400, a given sub-frame written by Rx indicates a sub-frame in which the PDCCH is monitored in the relay station apparatus 400. In the DL reception sub-frames in the relay station apparatus 400, a sub-frame drawn by a dotted line indicates a sub-frame in which the PDCCH is not monitored in the relay station apparatus 400.

On the other hand, in the UL transmission sub-frames in the relay station apparatus 400, a given sub-frame denoted by Tx indicates a sub-frame in which a UL backhaul is transmitted to the base station apparatus 300 in the relay station apparatus 400. In the UL transmission sub-frames in the relay station apparatus 400, a blank sub-frame indicates a sub-frame in which the UL backhaul is not transmitted. A UL synchronous HARQ process index Pk (where k=0, 1, 3, . . . : where k is a positive integer) is shown below the UL reception sub-frames. Hereinafter, a process corresponding to the UL synchronous HARQ process index Pk is referred to as "Process k (where k=0, 1, 3, . . . : where k is a positive integer)."

As in the first embodiment, in the second embodiment, the base station apparatus 300 first sets "the UL process monitored by the relay station apparatus 400" in the DRX of the relay station apparatus 400. In FIG. 5, Process 1 (denoted by P1 in FIG. 5) and Process 3 (denoted by P3 in FIG. 5) are the "UL processes monitored by the relay station apparatus 400." Next, the base station apparatus 300 notifies the relay station apparatus 400 of an instruction to perform the DRX and the process indexes (P1 and P3).

Then, the relay station apparatus 400 monitors only "the PDCCH of a sub-frame in which the PDCCH corresponding to the process index reported from the base station apparatus 300" as the process at the DRX time. In FIG. 5, the PDCCH corresponding to Process 1 (P1) is the PDCCH transmitted in sub-frame #1 from the base station apparatus 300. The PDCCH corresponding to Process 3 (P3) is the PDCCH transmitted in sub-frame #3 from the base station apparatus 300. Thus, the relay station apparatus 400 monitors the PDCCH of sub-frame #1 and the PDCCH of sub-frame #3. However, the relay station apparatus 400 does not monitor the PDCCHs of the sub-frames of sub-frames #0, #2, and #4 to #7.

Here, the fact that the relay station apparatus monitors the PDCCH means that the relay station apparatus receives the corresponding sub-frame and the relay station apparatus detects the PDCCH for the relay station apparatus itself. Further, the fact that the relay station apparatus does not monitor the PDCCH means that the relay station apparatus does not receive the corresponding sub-frame and does not consequently detect the PDCCH for the relay station apparatus itself.

The base station apparatus 300 transmits the PDCCH to the relay station apparatus 400 using the sub-frame monitored by the relay station apparatus 400. In FIG. 5, the base station apparatus 300 transmits the PDCCH to the relay station apparatus 400 using sub-frame #1 and sub-frame #3. The PDCCH includes the assignment information (DL assignment) regarding the DL data transmitted from the base station apparatus 300 to the relay station apparatus 400 and the assignment information (UL grant) regarding the UL data transmitted from the relay station apparatus 400 to the base station apparatus 300.

In the LTE, the DL data is transmitted with the sub-frame which is the same as the assignment information (DL assignment) regarding this DL data. In FIG. 5, the DL data is transmitted only with sub-frame #1 and sub-frame #3.

When the relay station apparatus 400 detects the PDCCH for the relay station apparatus itself among the monitored PDCCHs, the relay station apparatus 400 performs a process based on the contents of the detected PDCCH. Further, when the relay station apparatus 400 detects the assignment information (DL assignment) regarding the DL data included in the PDCCH from the monitored PDCCH, the relay station apparatus 400 receives the DL data transmitted with the same sub-frame based on the assignment information.

When the relay station apparatus 400 detects the assignment information (UL grant) regarding the UL data from the monitored PDCCH, the relay station apparatus 400 transmits the UL sub-frame among predetermined UL sub-frames to the base station apparatus 300. In the LTE, the relay station apparatus 400 transmits the UL data after four sub-frames, since the timing of receiving the PDCCH.

Hereinafter, the operations of the base station apparatus 300 and the relay station apparatus 400 will be described giving a case in which an error occurs while the relay station apparatus 400 receives data transmitted with sub-frame #1 from the base station apparatus 300 to the relay station apparatus 400.

In the case where an error occurs when the data transmitted with sub-frame #1 from the base station apparatus 300 to the relay station apparatus 400 is received, the relay station apparatus 400 notifies the base station apparatus 300 of Nack with sub-frame #5. In the case of the asynchronous HARQ, the DL retransmission data is transmitted within the sub-frames of a predetermined range after four sub-frames from the sub-frame with which the relay station apparatus 400 notifies the base station apparatus 300 of Nack. In the example shown in FIG. 5, sub-frames #9, #11, #17, and so on are sub-frame candidates with which the base station apparatus 300 transmits the DL retransmission data.

Then, the base station apparatus 300 changes the retransmission of the DL to the synchronous HARQ in which the RTT is fixed. Hereinafter, a case in which the RTT is fixed to eight sub-frames will be described. That is, the relay station apparatus 300 transmits the retransmission data of the DL with sub-frame #9 which is a sub-frame after four sub-frames from sub-frame #5 with which Nack from the relay station apparatus 400 is received.

As in the first embodiment, in the second embodiment, the DRX can be set without reduction in the transmission and reception change. Therefore, the power consumption can be reduced without large delay of the data transmission and reception.

In the second embodiment, the retransmission of the DL is changed to the synchronous HARQ in which the RTT is fixed. Therefore, when an error occurs in the DL transmission data, the advantage of suppressing the delay until the transmission of the retransmission data of the DL can be obtained.

When the base station apparatus 300 instructs the relay station apparatus 400 to performs the DRX process, the relay station apparatus 400 may recognize the retransmission of the DL from the asynchronous HARQ to the synchronous HARQ in which the RTT is fixed, and may control the reception process. That is, when the relay station apparatus 400 receives the instruction to perform the DRX process from the base station apparatus 300, the relay station apparatus 400 may change the reception timing of the DL during the DRX process such that the reception timing of the DL is restricted to a timing of the synchronous HARQ. Thus, when an error occurs in the DL transmission data transmitted from the base station apparatus 300 to the relay station apparatus 400 and the relay station apparatus 400 thus notifies the base station apparatus 300 of Nack, the relay station apparatus 400 may receive only the retransmission data at a timing at which the base station apparatus 300 transmits the retransmission data.

In the asynchronous HARQ of the DL, the process index information of the HARQ of the DL is reported in the assignment information regarding the DL data transmitted with the PDCCH to manage the transmission data and the retransmission data. Therefore, when the relay station apparatus 400 knows that the retransmission of the DL is the synchronous HARQ of the DL in the DRX process, the base station apparatus 300 does not need to notify the relay station apparatus 400 of the process index, and thus can notify the relay station apparatus 400 of another information in the information used to report the process index.

Figure 6:
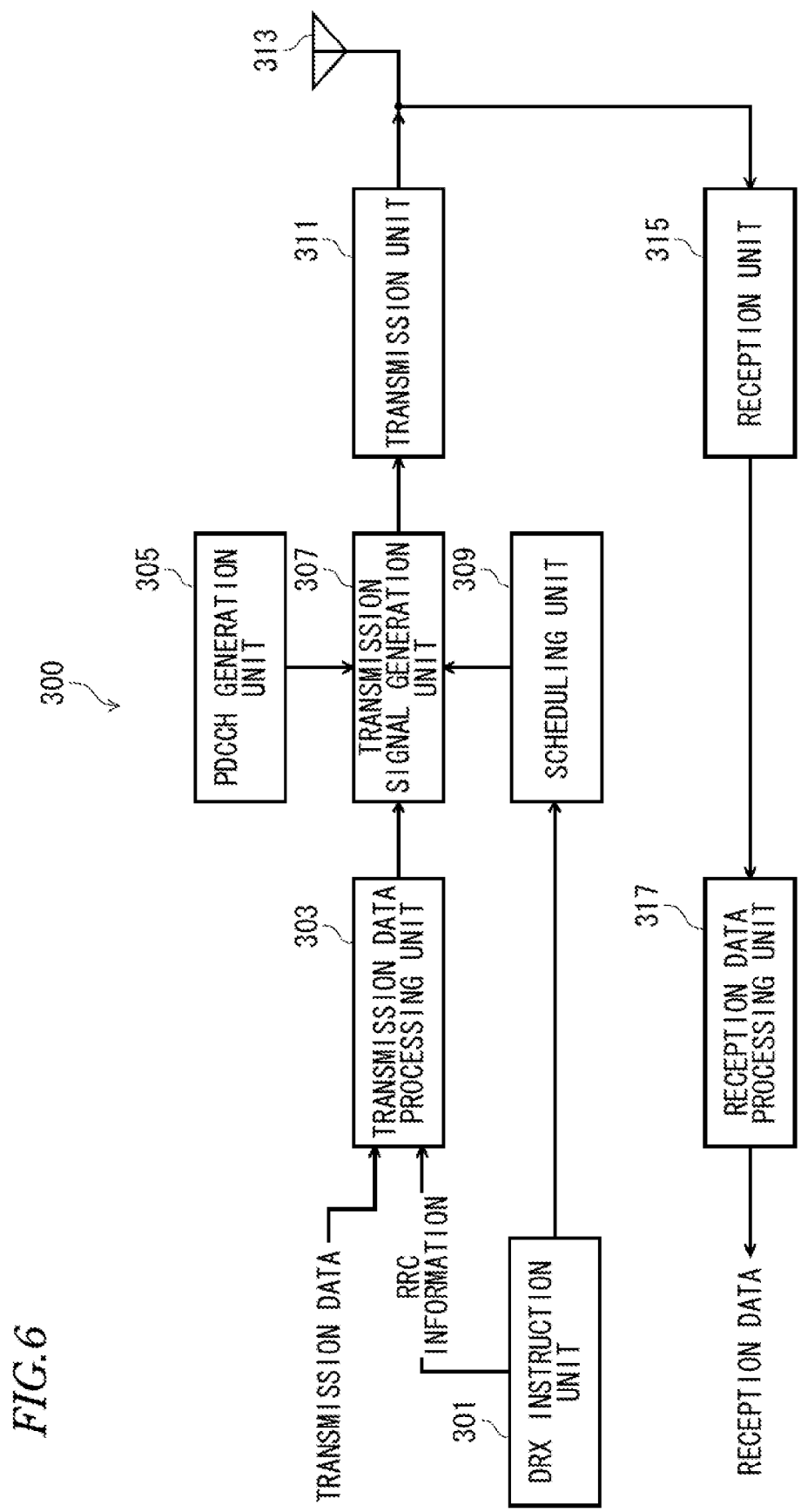
FIG. 6 is a block diagram illustrating the configuration of a base station 300.

Next, the configuration of the base station apparatus (eNB) 300 will be described with reference to FIG. 6. FIG. 6 is a block diagram illustrating the configuration of the base station apparatus 300. As shown in FIG. 6, the base station apparatus 300 includes a DRX instruction unit 301, a transmission data processing unit 303, a PDCCH generation unit 305, a transmission signal generation unit 307, a scheduling unit 309, a transmission unit 311, an antenna 313, a reception unit 315, and a reception data processing unit 317.

Transmission data is data which is transmitted to the relay station apparatus (RN) 400 along a downlink and is input to the transmission data processing unit 303.

RRC information is one of the control information of which the base station apparatus itself notifies the relay station apparatus 400. In this embodiment, the RRC information includes DRX instruction information and a monitor process index. The RRC information is output together with the transmission data to the transmission data processing unit 303.

The DRX instruction unit 301 gives the DRX instruction information to the relay station apparatus 400 when the relay station apparatus 400 performs a DRX process and gives the monitor process index used to monitor the PDCCH when the relay station apparatus 400 performs the DRX process. Through the RRC information, the relay station apparatus 400 is notified of the DRX instruction information and the monitor process index for the relay station apparatus 400. The relay station apparatus 400 may be notified of the DRX instruction information and the monitor process index at the same timing or the relay station apparatus 400 may be notified at different timings. As a method of notifying the relay station apparatus 400 of the DRX instruction information and the monitor process index at different timings, for example, a method of causing the base station apparatus 300 to notify the relay station apparatus 400 of the monitor process index in advance and causing the base station apparatus 300 to notify the relay station apparatus 400 of the DRX instruction information when the relay station apparatus 400 performs the DRX can be used.

The transmission data processing unit 303 performs transmission processes, such as an encoding process and a modulating process, on the transmission data and the RRC information. The transmission data subjected to the transmission processes is output to the transmission signal generation unit 307.

The PDCCH generation unit 305 generates the PDCCH. The PDCCH includes assignment information of DL data and assignment information of UL data. Each assignment information includes resource assignment information, which is a result obtained through scheduling of the scheduling unit 309, and MCS information of data. The generated PDCCH is output to the transmission signal generation unit 307.

The transmission signal generation unit 307 generates a transmission signal from the transmission data subjected to the transmission processes, the PDCCH, or the like based on the scheduling result obtained from the scheduling unit 309. As the process of generating the transmission signal, in the example of the LTE, a method of multiplexing the transmission data and the PDCCH and performing OFDM can be performed. The generated transmission signal is output to the transmission unit 311.

The scheduling unit 309 performs scheduling on the DL data and the UL data. The scheduling unit 309 separately performs the scheduling on the DL data and the UL data based on link quality information or the like (not shown) and outputs the scheduling result to the transmission signal generation unit 307. At this time, the scheduling unit 309 performs the scheduling based on the DRX instruction information and the monitor process index output from the DRX instruction unit 301. In regard to the relay station apparatus 400 instructed by the DRX instruction information from the DRX instruction unit 301, the base station apparatus 300 performs the scheduling for the relay station apparatus 400 only on "the sub-frame with which the PDCCH" corresponding to the monitor process index in the relay station apparatus 400. The scheduling unit 309 performs the scheduling such that the DL data becomes the synchronous HARQ, when performing the scheduling on the relay station apparatus 400. The scheduling unit 309 performs the scheduling for the relay station apparatus 400 to which the DRX instruction information is output from the DRX instruction unit 301, such that the DL data for the relay station apparatus 400 becomes the synchronous HARQ in which the RTT is fixed.

The transmission unit 311 performs wireless transmission processes on the transmission signal generated by the transmission signal generation unit 307. As the wireless transmission processes, for example, a process of converting the input transmission signal into analog signal, a process of amplifying transmission power, a filtering process, and a frequency converting process can be performed. The transmission signal subjected to the wireless transmission processes is transmitted from the antenna 313.

The reception unit 315 performs wireless reception processes on a signal transmitted from a communication partner and received by the antenna 313. As the wireless reception processes, for example, a frequency converting process and a filtering process are performed. The reception signal subjected to the wireless reception processes is output to the reception data processing unit 317.

The reception data processing unit 317 performs reception processes on the reception signal on which the reception unit 315 performs the wireless reception processes. As the reception processes, for example, a process of converting the input signal into a digital signal, a demodulating process, and a decoding process can be performed. The data subjected to the reception processes is the reception data.

Figure 7:
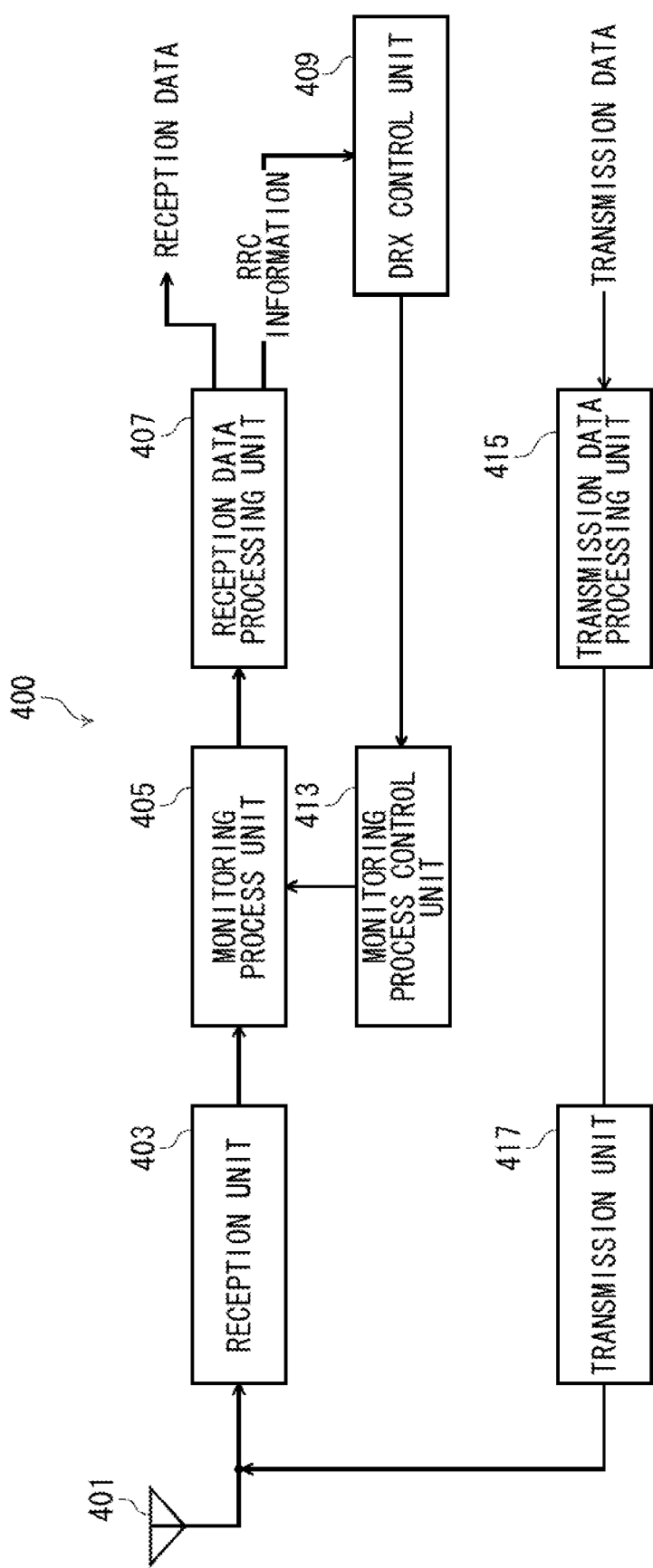
FIG. 7 is a block diagram illustrating the configuration of a relay station 400.

Next, the configuration of the relay station apparatus (RN) 400 will be described with reference to FIG. 7. FIG. 7 is a block diagram illustrating the configuration of the relay station apparatus 400. As shown in FIG. 7, the relay station apparatus 400 includes an antenna 401, a reception unit 403, a monitoring process unit 405, a reception data processing unit 407, a DRX control unit 409, a monitoring process control unit 413, a transmission data processing unit 415, and a transmission unit 417.

The reception unit 403 performs wireless reception processes on the signal transmitted from the base station apparatus (eNB) 300 and received by the antenna 401. As the wireless reception processes, for example, a frequency converting process and a filtering process can be performed. The reception signal subjected to the wireless reception processes is output to the monitoring process unit 405.

The monitoring process unit 405 detects whether the reception signal subjected to the wireless reception processes includes the PDCCH for the relay station apparatus itself based on an instruction of the monitoring process control unit 413. When the monitoring process unit 405 detects the PDCCH for the relay station apparatus itself, the monitoring process unit 405 outputs the detected PDCCH and the reception signal to the reception data processing unit 407.

The reception data processing unit 407 performs a demodulating process, a decoding process, and the like on the reception signal based on the PDCCH for the relay station apparatus itself output from the monitoring process unit 405. The data subjected to the reception processes are the reception data and the RRC information. The reception data is data which is transmitted from the base station apparatus (eNB) 300 to the relay station apparatus itself along the DL. The RRC information is RRC information transmitted from the base station apparatus (eNB) 300 to the relay station apparatus itself along the DL. The RRC information includes the DRX instruction information and the monitor process index.

The DRX control unit 409 stores the monitor process index of which the base station apparatus (eNB) 300 notifies the relay station apparatus 400 by the RRC information. Further, when the base station apparatus (eNB) 300 instructs the relay station apparatus itself to perform the DRX process by the RRC information, the DRX control unit 409 outputs the monitor process index to the monitoring process control unit 413 to instruct the monitoring process control unit 413 to perform the DRX process.

When the monitoring process control unit 413 receives the instruction to perform the DRX process from the DRX control unit 409, the monitoring process control unit 413 detects the sub-frame number used to monitor the PDCCH from the monitor process index output from the DRX control unit 409 and instructs the monitoring process unit 405 to monitor the PDCCH in the detected sub-frame number used to monitor the PDCCH.

The transmission data is data which is transmitted from the relay station apparatus itself to the base station apparatus (eNB) 300 along the UL.

The transmission data processing unit 415 performs transmission processes, such as an encoding process and a modulating process, on the transmission data.

The transmission unit 417 performs wireless transmission processes on the data subjected to the transmission processes. As the wireless transmission processes, for example, a process of converting the input transmission signal into an analog signal, a process of amplifying transmission power, and a frequency converting process can be performed. The transmission signal subjected to the wireless transmission processes is transmitted from the antenna 401.

In this embodiment, the DRX method in the relay station apparatus has been described. However, the DRX method is not limited to the relay station apparatus, but may be also applied to the UE (terminal apparatus). In this case, this DRX method can be used together with the DRX method of the LTE described in the conventional method.

In this embodiment, the case has been described in which the DRX method of this embodiment is applied to the relay station apparatus switching the backhaul link and the access link with respect to the time axis (sub-frame unit), but the invention is not limited thereto. The DRX method of this embodiment may be applied to a relay station apparatus which switches the backhaul link and the access link with respect to a frequency axis.

When the DRX is performed, the number of processes monitored in the relay station apparatus may be changed without notification of the RRC information from the base station apparatus to the relay station apparatus. For example, the following method may be used. The relay station apparatus monitors the PDCCH corresponding to the monitored process to detect whether the PDCCH for the relay station apparatus itself is present. The monitored PDCCH may not necessarily be the PDCCH for the relay station apparatus itself.

Accordingly, the number of processes to be monitored is set to be small. When the PDCCH for the relay station apparatus itself is detected, and the number of processes used for the relay station apparatus to monitor the PDCCH may be increased. Thus, when no data to be transmitted and received is present, the number of processes used for the relay station apparatus to monitor the PDCCH can be decreased, so that the reception power consumption is reduced Conversely, when data to be transmitted and received is present, the number of processes used for the relay station apparatus to monitor the PDCCH can be increased so that the delay occurring due to the restriction on the number of processes is suppressed. The PDCCH for the relay station apparatus itself includes the assignment information (DL assignment) regarding the DL data and the assignment information (UL grant) regarding the UL data.

In the PDCCH monitored by the relay station apparatus, when the amount of data equal to or greater than a predetermined amount of data is transmitted in the assignment information (DL assignment) regarding the DL data, the number of processes used for the relay station apparatus to monitor the PDCCH may be increased. Thus, when the amount of data equal to or greater than the predetermined amount of data is transmitted, the amount of data transmitted from the base station apparatus is considered to be considerable, and therefore abundant data can be transmitted by increasing the number of processes. Accordingly, the delay occurring due to the restriction on the number of processes can be suppressed.

The relay station sometimes notifies base station apparatus of the data transmitted with the UL and indicating how much data is transmitted by the relay station apparatus. When the base station apparatus is notified of the amount of data equal to or greater than a predetermined amount of data, the number of processes to be monitored may be increased. Thus, when the amount of data equal to or greater than the predetermined amount of data is accumulated in the relay station apparatus, the number of processes can be increased, so that abundant amount can be transmitted. Accordingly, the delay occurring due to the restriction on the number of processes can be suppressed.

When the data transmitted and received in the relay station apparatus is data relayed between the UE (terminal apparatus) and the base station apparatus, the number of processes has been increased. However, the number of processes may not be increased for the data communicated between the relay station apparatus and the base station apparatus. The amount of data between the base station apparatus and the UE sometimes becomes large. On the other hand, the data communicated between the relay station apparatus and the base station apparatus is control information, and thus the amount of data is sometimes small. In this case, when data is data communicated between the base station apparatus and the UE, the large amount of data can be configured to be transmitted by increasing the number of processes. Thus, the delay occurring due to the restriction on the number of processes can be suppressed.

When the DRX is performed, the following may be restricted in addition to the process used for the relay station apparatus to monitor the PDCCH. The relay station apparatus monitors whether the PDCCH for the relay station apparatus itself is not present in the sub-frame with which the PDCCH corresponding to the process to be monitored. In the LTE, when the PDCCH is monitored, the PDCCH for the relay station apparatus itself is searched by blind determination. An area subjected to the blind determination is referred to as a search space. A different search space is allocated to each terminal. Accordingly, when the DRX is performed, the search space can be restricted. Thus, since it is possible to reduce the number of times the blind determination is performed, the reception power consumption can be reduced.

The search space includes not only the search space for individual terminal but also a common search space monitored by all of the terminals. When the DRX is performed, a sub-frame for which the common search space is not monitored may be provided. Accordingly, when the amount of traffic is relatively small, the DRX is performed, and thus the reception power consumption can be reduced. In this case, since the sub-frames with which a transmission side transmits common information reported in the common search space can be restricted, the sub-frames used for a reception side to monitor the common search space may be said to be restricted. Thus, since it is possible to reduce the number of sub-frames used to monitor the common search space, the reception consumption power can be reduced.

Third Embodiment

Figure 8:
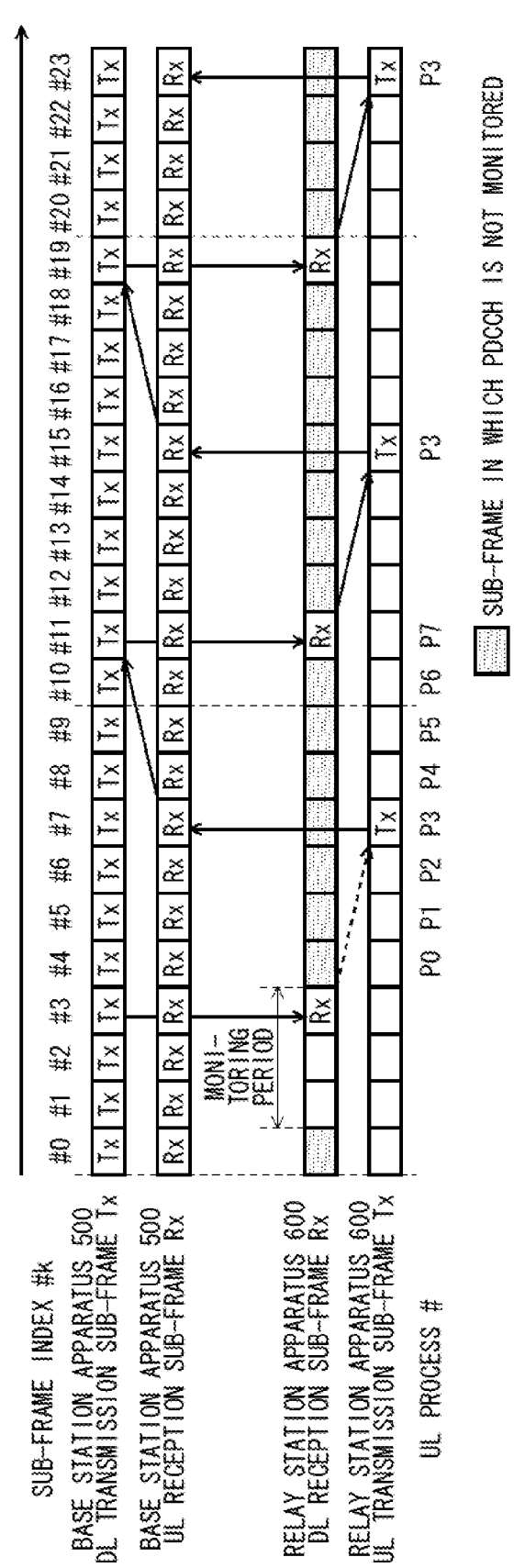
FIG. 8 is a diagram illustrating a DRX method according to a third embodiment.

A DRX method according to a third embodiment will be described with reference to FIG. 8. FIG. 8 is a diagram illustrating the DRX method according to the third embodiment. FIG. 8 shows data exchange in a backhaul link, that is, communication between the base station apparatus (eNB) 500 and the relay station apparatus (RN) 600 at the DRX time. In this embodiment, a method of switching from the DRX method by a timer in the LTE to the DRX method of the first embodiment will be described.

Here, in FIG. 8, each box represents a sub-frame and the horizontal axis represents a time. The sub-frames in two upper stages indicate a DL transmission sub-frame Tx and a UL reception sub-frame Rx in the base station apparatus 500. The sub-frames in two lower stages indicate a DL reception sub-frame Rx and a UL transmission sub-frame Tx in the relay station apparatus 600.

In FIG. 8, in the DL reception sub-frames in the relay station apparatus 600, a given sub-frame written by Rx indicates a sub-frame in which the PDCCH is monitored in the relay station apparatus 600. In the DL reception sub-frames in the relay station apparatus 600, a sub-frame drawn by a dotted line indicates a sub-frame in which the PDCCH is not monitored in the relay station apparatus 600.

On the other hand, in the UL transmission sub-frames in the relay station apparatus 600, a given sub-frame denoted by Tx indicates a sub-frame in which a UL backhaul is transmitted to the base station apparatus 500 in the relay station apparatus 600. In the UL transmission sub-frames in the relay station apparatus 600, a blank sub-frame indicates a sub-frame in which the UL backhaul is not transmitted. A UL synchronous HARQ process index Pk (where k=0, 1, 3, . . . : where k is a positive integer) is shown below the UL reception sub-frames. Hereinafter, a process corresponding to the UL synchronous HARQ process index Pk is referred to as "Process k (where k=0, 1, 3, . . . : where k is a positive integer)."

First, the base station apparatus 500 determines a monitor sub-frame position at which the relay station apparatus 600 monitors the PDCCH of new data and notifies the relay station apparatus 600 of information regarding the monitoring sub-frame position. The information regarding the monitoring sub-frame position may be information regarding a start position of the monitoring sub-frame, the length of the monitoring sub-frame, a length up to the subsequent monitoring sub-frame, or may be bitmap information indicating a monitoring sub-frame position.

In FIG. 8, sub-frames #1, #2, and #3 are the monitoring sub-frames. The relay station apparatus 600 notified of the monitoring sub-frame position information monitors the PDCCH transmitted by the base station apparatus 500, when the sub-frames become the monitoring sub-frames. Here, the monitoring operation is set to a monitoring mode based on the monitoring sub-frame position information. The base station apparatus 500 transmits the PDCCH of the new data to be transmitted to the relay station apparatus 600 with the monitoring sub-frames of the corresponding relay station apparatus 600.

Here, new DL data and new UL data are present as the new data. The assignment information (DL assignment) regarding the new DL data and the assignment information (UL grant) regarding the new UL data are present as the PDCCH of the new data.

When the relay station apparatus 600 detects the PDCCH for the relay station apparatus itself in the monitoring sub-frames, the relay station apparatus 600 sets the process corresponding to the PDCCH as a monitoring process. That is, a method of monitoring the plurality of processes in a monitoring period is switched to a method of monitoring the processes by restricting the processes, as in the first embodiment.

Here, the monitoring operation is set to a monitoring mode based on the monitoring process. In FIG. 8, the base station apparatus 500 transmits the PDCCH to the relay station apparatus 600 with sub-frame #3. When the process index of the UL is assumed to be P3, P3 is set as the monitoring process. Here, when the relay station apparatus 600 finds the PDCCH for the relay station apparatus itself, new DL data, new UL data, or both new data are generated. Until Ack is replied to the new data and the process is completed, the relay station apparatus 600 continuously monitors the process. After the relay station apparatus 600 ends the continuous monitoring, the relay station apparatus 600 does not monitor the PDCCH until start of the monitor sub-frame of the subsequent new data.

As described above, the base station apparatus 500 sometimes assign the new data to the relay station apparatus 600 with one of the monitoring sub-frames. That is, the base station apparatus 500 according to the third embodiment can perform recourse assignment in the base station apparatus 500 more flexibly than the base station apparatus 100 according to the first embodiment.

Figure 9:
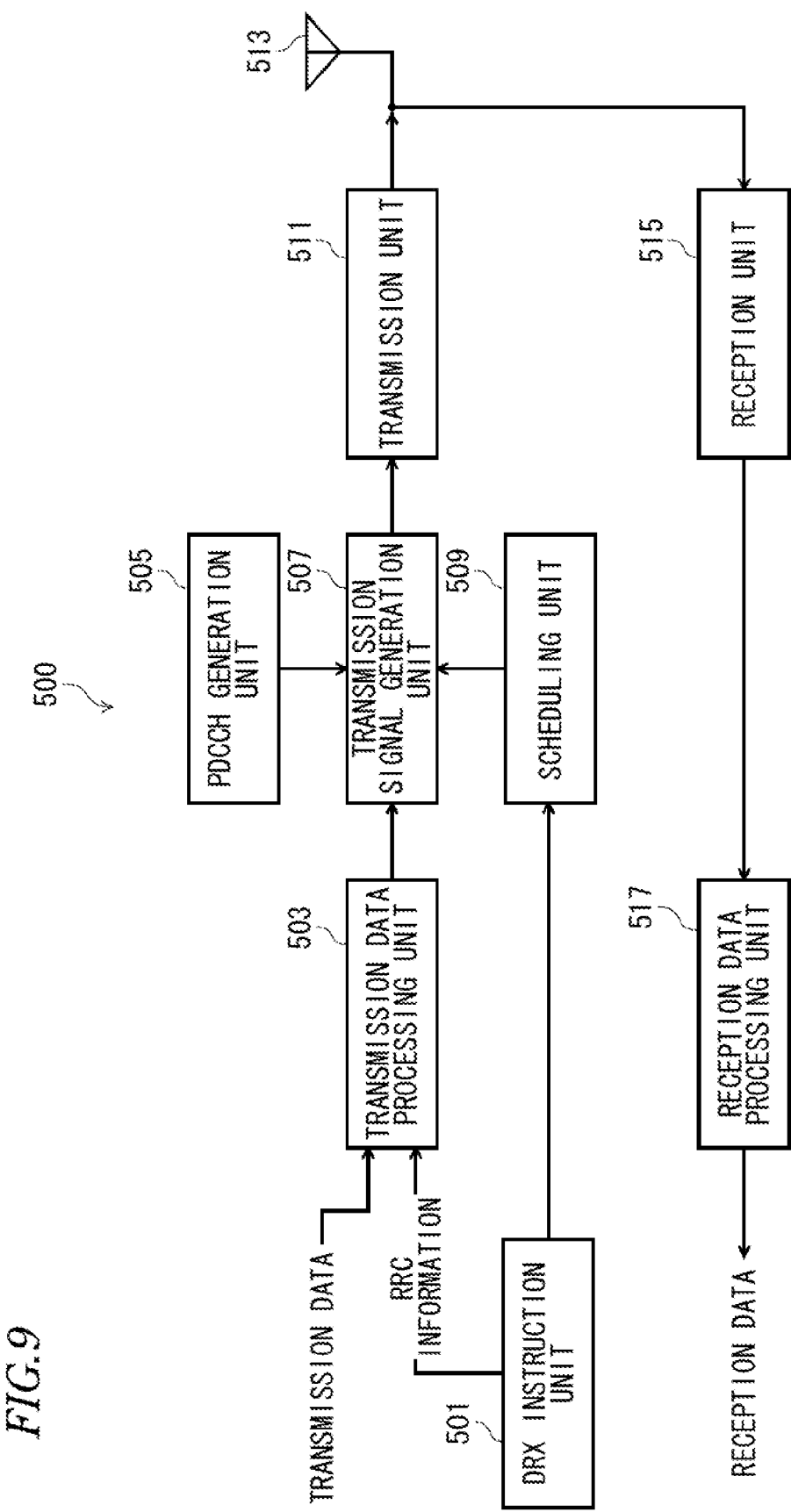
FIG. 9 is a block diagram illustrating the configuration of a base station 500.

Next, the configuration of the base station apparatus (eNB) 500 will be described with reference to FIG. 9. FIG. 9 is a block diagram illustrating the configuration of the base station apparatus 500. As shown in FIG. 9, the base station apparatus 500 includes a DRX instruction unit 501, a transmission data processing unit 503, a PDCCH generation unit 505, a transmission signal generation unit 507, a scheduling unit 509, a transmission unit 511, an antenna 513, a reception unit 515, and a reception data processing unit 517. Here, the base station apparatus 500 shown in FIG. 9 differs from the base station apparatus 100 shown in FIG. 3 in the operations of the DRX instruction unit 501 and the scheduling unit 509.

Transmission data is data which is transmitted to the relay station apparatus (RN) 600 along a downlink and is input to the transmission data processing unit 503.

RRC information is one of the control information of which the base station apparatus itself notifies the relay station apparatus 600. In this embodiment, the RRC information includes DRX instruction information and a monitor process index. The RRC information is output together with the transmission data to the transmission data processing unit 503.

The DRX instruction unit 501 gives the DRX instruction information to the relay station apparatus 600 when the relay station apparatus 600 performs a DRX process and gives the sub-frame position information used to monitor the PDCCH when the relay station apparatus 600 performs the DRX process. Through the RRC information, the relay station apparatus 600 is notified of the DRX instruction information regarding the relay station apparatus 600 and the monitoring sub-frame position information. The relay station apparatus 600 may be notified of the DRX instruction information and the sub-frame position information at the same timing or the relay station apparatus 600 may be notified at different timings. The monitoring sub-frame position information may be information regarding a monitoring start position, the length of the monitoring sub-frame, or a length up to the subsequent monitoring sub-frame, or may be bitmap information indicating a monitoring sub-frame position.

When performing the scheduling on the relay station apparatus 600 to which the DRX instruction unit 501 gives the DRX instruction information, the scheduling unit 509 performs the scheduling the new data within the monitoring period of the relay station apparatus 600. Here, the scheduling unit 509 stores the process index corresponding to the sub-frame for which the scheduling is performed on the relay station apparatus 600.

When an error occurs in the new data and the new data is retransmitted, the scheduling unit 509 performs the scheduling of the retransmission data on the relay station apparatus 600 only for the sub-frame with which the PDCCH corresponding to the stored monitor process index is transmitted.

The transmission unit 511 performs wireless transmission processes on the transmission signal generated by the transmission signal generation unit 507. As the wireless transmission processes, for example, a process of converting the input transmission signal into analog signal, a process of amplifying transmission power, a filtering process, and a frequency converting process can be performed. The transmission signal subjected to the wireless transmission processes is transmitted from the antenna 513.

The reception unit 515 performs wireless reception processes on a signal transmitted from a communication partner and received by the antenna 513. As the wireless reception processes, for example, a frequency converting process and a filtering process are performed. The reception signal subjected to the wireless reception processes is output to the reception data processing unit 517.

The reception data processing unit 517 performs reception processes on the reception signal on which the reception unit 515 performs the wireless reception processes. As the reception processes, for example, a process of converting the input signal into a digital signal, a demodulating process, and a decoding process can be performed. The data subjected to the reception processes is the reception data.

Figure 10:
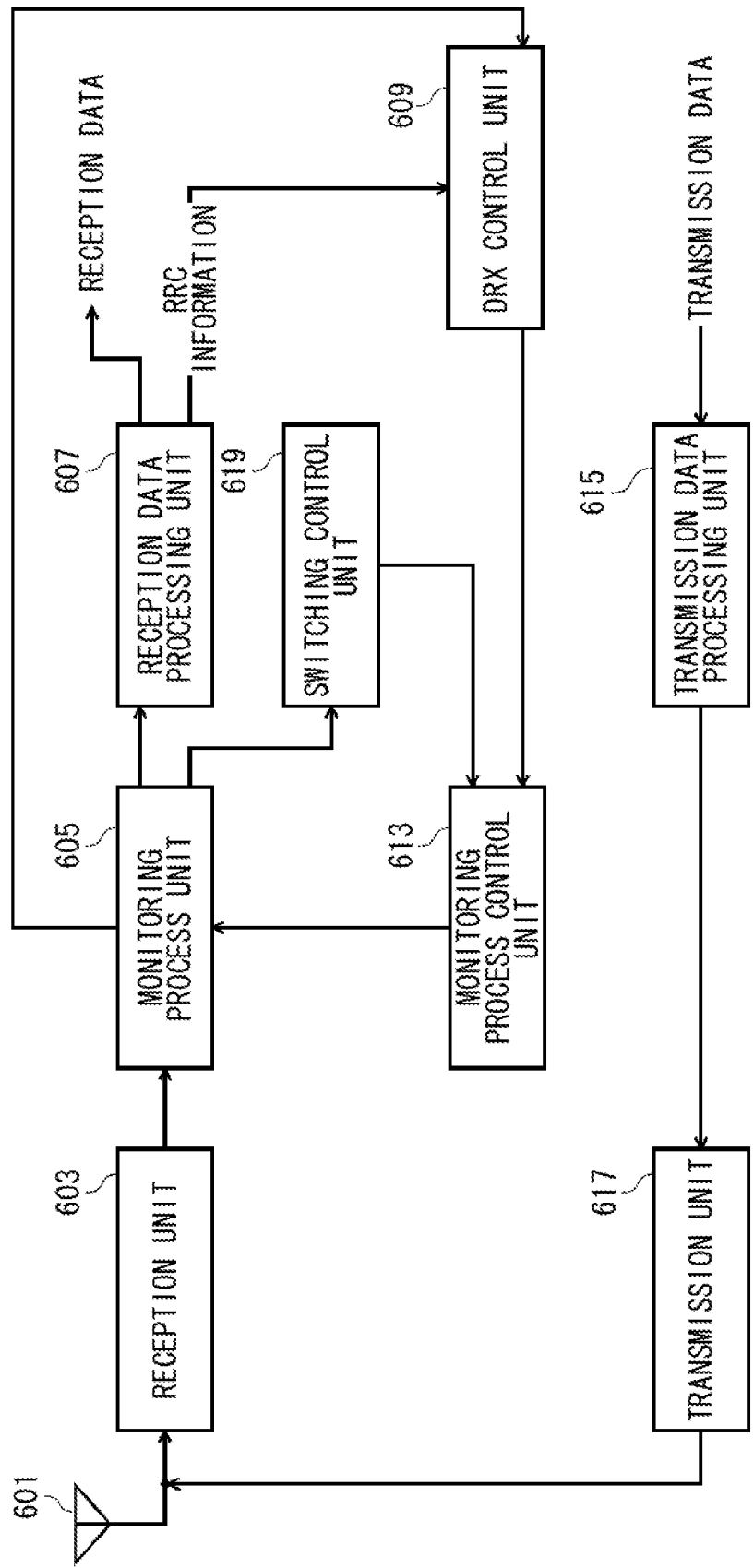
FIG. 10 is a block diagram illustrating the configuration of a relay station 600.
Figure 11:
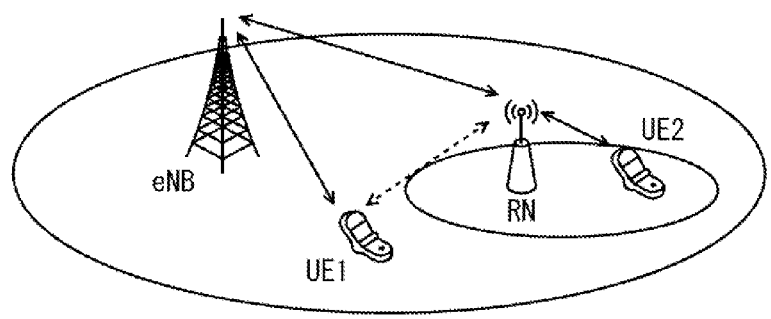
FIG. 11 is a diagram illustrating a communication system using Relay.
Figure 12:
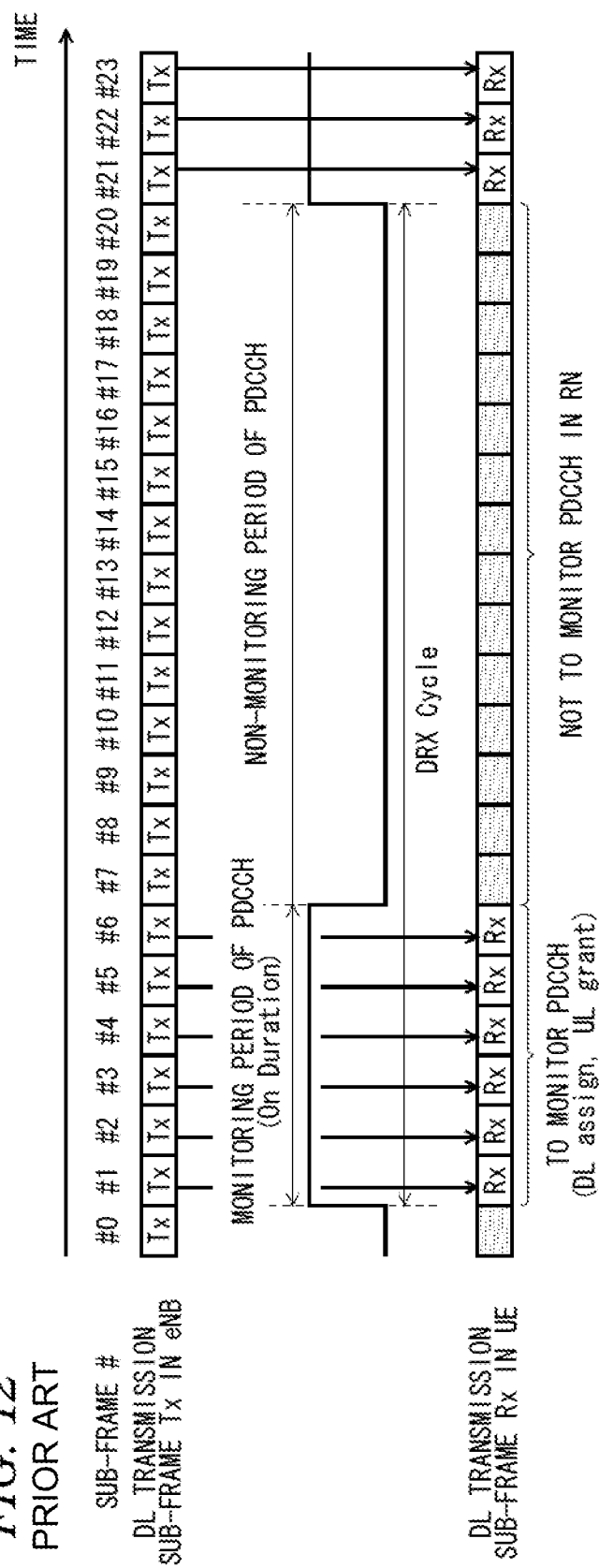
FIG. 12 is a diagram illustrating DRX of a UE in the LTE.

Next, the configuration of the relay station apparatus (RN) 600 will be described with reference to FIG. 10. FIG. 10 is a block diagram illustrating the configuration of the relay station apparatus 600. As shown in FIG. 10, the relay station apparatus 600 includes an antenna 601, a reception unit 603, a monitoring process unit 605, a reception data processing unit 607, a DRX control unit 609, a monitoring process control unit 613, a transmission data processing unit 615, a transmission unit 617, and a switching control unit 619. The relay station apparatus 600 shown in FIG. 10 is different from the relay station apparatus 200 shown in FIG. 4 in that the switching control unit 619 is added.

The reception unit 603 performs wireless reception processes on the signal transmitted from the base station apparatus (eNB) 500 and received by the antenna 601. As the wireless reception processes, for example, a frequency converting process and a filtering process can be performed. The reception signal subjected to the wireless reception processes is output to the monitoring process unit 605.

The monitoring process unit 605 detects whether the reception signal subjected to the wireless reception processes includes the PDCCH for the relay station apparatus itself based on an instruction of the monitoring process control unit 613. When the monitoring process unit 605 detects the PDCCH for the relay station apparatus itself, the monitoring process unit 605 outputs the detected PDCCH and the reception signal to the reception data processing unit 607 and also outputs the process index corresponding to the detected PDCCH to the DRX control unit 609. Further, the monitoring process unit 605 notifies the switching control unit 619 that the PDCCH is detected.

The reception data processing unit 607 performs a demodulating process, a decoding process, and the like on the reception signal based on the PDCCH for the relay station apparatus itself output from the monitoring process unit 605. The data subjected to the reception processes are the reception data and the RRC information. The reception data is data which is transmitted from the base station apparatus (eNB) 500 to the relay station apparatus itself along the DL. The RRC information is RRC information transmitted from the base station apparatus (eNB) 500 to the relay station apparatus itself along the DL. The RRC information includes the DRX instruction information and the monitor process index.

The DRX control unit 609 stores the sub-frame position information for monitoring the PDCCH of which the base station apparatus (eNB) 500 notifies the relay station apparatus 600 by the RRC information. Further, when the monitoring process unit 605 detects the PDCCH for the relay station apparatus itself, the DRX control unit 609 stores the process index corresponding to the PDCCH as a process index for monitoring the PDCCH. Further, when the base station apparatus (eNB) 500 instructs the relay station apparatus itself to perform the DRX process by the RRC information, the DRX control unit 609 outputs the sub-frame position information for monitoring the PDCCH and the monitor process index for monitoring the PDCCH to the monitoring process control unit 613 to instruct the monitoring process control unit 613 to perform the DRX process.

When the monitoring process unit 605 notifies the switching control unit 619 of the detection of the PDCCH for the relay station apparatus itself, the switching control unit 619 switches a mode from a monitoring mode based on the monitoring sub-frame position information to the monitoring mode based on the monitoring process. Here, the monitoring mode based on the monitoring sub-frame position information describes an operation of monitoring the PDCCH within a range based on the monitoring sub-frame position information. Further, the monitoring mode based on the monitoring process describes an operation of monitoring the PDCCH by restricting the monitoring process. The switching control unit 619 instructs the monitoring process control unit 613 to select one of these monitoring modes.

The monitoring process control unit 613 selects the monitoring mode based on the monitoring sub-frame position information or select the monitoring mode based on the monitoring process, in response to the instruction from the switching control unit 619 and determines the monitoring sub-frame. When the instruction from the switching control unit 619 indicates the monitoring mode based on the monitoring sub-frame position information, the monitoring sub-frame is determined based on the monitoring sub-frame position information output from the DRX control unit 609. On the other hand, when the instruction from the switching control unit 619 indicates the monitoring mode based on the monitoring process, the monitoring sub-frame is determined based on the monitoring process index output from the DRX control unit 609. The monitoring process control unit 613 instructs the monitoring process unit 605 to monitor the PDCCH for the sub-frame number of the determined monitoring sub-frame.

The transmission data is data which is transmitted from the relay station apparatus itself to the base station apparatus (eNB) 500 along the UL.

The transmission data processing unit 615 performs transmission processes, such as an encoding process and a modulating process, on the transmission data.

The transmission unit 617 performs wireless transmission processes on the data subjected to the transmission processes. As the wireless transmission processes, for example, a process of converting the input transmission signal into an analog signal, a process of amplifying transmission power, and a frequency converting process can be performed. The transmission signal subjected to the wireless transmission processes is transmitted from the antenna 601.

In this embodiment, the case has been described in which the DRX control unit 609 outputs the monitoring sub-frame position information and the monitoring process index and the monitoring process index to the monitoring process control unit 613, but the invention is not limited thereto. For example, by causing the switching control unit 619 to instruct the DRX control unit 609 of the monitoring mode, the DRX control unit 609 may output the monitoring sub-frame position information or the monitoring process index. When the DRX control unit 609 receives the instruction of the monitoring mode based on the monitoring sub-frame position information, the DRX control unit 609 outputs the monitoring sub-frame position information. Conversely, when the DRX control unit 609 receives the instruction of the monitoring mode based on the monitoring process, the DRX control unit 609 outputs the monitoring process index.

In this embodiment, one process within the monitoring period has been described, but a plurality of processes may be used. Within the monitoring period, the new data may allocated to the plurality of processes. In this case, each process can be separately controlled.

As a method of ending the monitoring for the process monitored in the relay station apparatus 600 by transmitting new data within the monitoring period, for example, the following method can be used. A method of restricting the number of times new data is transmitted in the monitoring process can be used. For example, new data is configured to be transmitted up to three times in the same process. When the third new data is completed using Ack, the monitoring of this process ends.

Further, a method of giving a notification of an end flag may be used. The relay station apparatus 600 monitors the PDCCH in the process being monitored. The monitoring end flag is configured to be included in the PDCCH. When the monitoring end flag indicates the end of the monitoring, the relay station apparatus 600 ends the monitoring of the process.

Furthermore, a duration in which the monitoring continues may be set. When the duration expires, the monitoring period may end.

In this embodiment, the example of the sub-frames continuous as the monitoring sub-frames has been described. However, discontinuous sub-frames may be used.

In this embodiment, the DRX method in the relay station apparatus has been described. However, the DRX method is not limited to the relay station apparatus, but may be also applied to the UE (terminal apparatus). In this case, this DRX method can be used together with the DRX method of the LTE described in the conventional method.

In this embodiment, the case has been described in which the DRX method of this embodiment is applied to the relay station apparatus switching the backhaul link and the access link with respect to the time axis (sub-frame unit), but the invention is not limited thereto. The DRX method of this embodiment may be applied to a relay station apparatus which switches the backhaul link and the access link with respect to a frequency axis.

When the DRX is performed, the number of processes monitored in the relay station apparatus may be changed without notification of the RRC information from the base station apparatus to the relay station apparatus. For example, the following method may be used. The relay station apparatus monitors the PDCCH corresponding to the monitored process to detect whether the PDCCH for the relay station apparatus itself is present. The monitored PDCCH may not necessarily be the PDCCH for the relay station apparatus itself.

Accordingly, the number of processes to be monitored is set to be small. When the PDCCH for the relay station apparatus itself is detected, and the number of processes used for the relay station apparatus to monitor the PDCCH may be increased. Thus, when no data to be transmitted and received is present, the number of processes used for the relay station apparatus to monitor the PDCCH can be decreased, so that the reception power consumption is reduced.

Conversely, when data to be transmitted and received is present, the number of processes used for the relay station apparatus to monitor the PDCCH can be increased so that the delay occurring due to the restriction on the number of processes is suppressed. The PDCCH for the relay station apparatus itself includes the assignment information (DL assignment) regarding the DL data and the assignment information (UL grant) regarding the UL data.

In the PDCCH monitored by the relay station apparatus, when the amount of data equal to or greater than a predetermined amount of data is transmitted in the assignment information (DL assignment) regarding the DL data, the number of processes used for the relay station apparatus to monitor the PDCCH may be increased. Thus, when the amount of data equal to or greater than the predetermined amount of data is transmitted, the amount of data transmitted from the base station apparatus is considered to be considerable, and therefore abundant data can be transmitted by increasing the number of processes. Accordingly, the delay occurring due to the restriction on the number of processes can be suppressed.

The relay station sometimes notifies base station apparatus of the data transmitted with the UL and indicating how much data is transmitted by the relay station apparatus. When the base station apparatus is notified of the amount of data equal to or greater than a predetermined amount of data, the number of processes to be monitored may be increased. Thus, when the amount of data equal to or greater than the predetermined amount of data is accumulated in the relay station apparatus, the number of processes can be increased, so that abundant amount can be transmitted. Accordingly, the delay occurring due to the restriction on the number of processes can be suppressed.

When the data transmitted and received in the relay station apparatus is data relayed between the UE (terminal apparatus) and the base station apparatus, the number of processes has been increased. However, the number of processes may not be increased for the data communicated between the relay station apparatus and the base station apparatus. The amount of data between the base station apparatus and the UE sometimes becomes large. On the other hand, the data communicated between the relay station apparatus and the base station apparatus is control information, and thus the amount of data is sometimes small. In this case, when data is data communicated between the base station apparatus and the UE, the large amount of data can be configured to be transmitted by increasing the number of processes. Thus, the delay occurring due to the restriction on the number of processes can be suppressed.

When the DRX is performed, the following may be restricted in addition to the process used for the relay station apparatus to monitor the PDCCH. The relay station apparatus monitors whether the PDCCH for the relay station apparatus itself is not present in the sub-frame with which the PDCCH corresponding to the process to be monitored. In the LTE, when the PDCCH is monitored, the PDCCH for the relay station apparatus itself is searched by blind determination. An area subjected to the blind determination is referred to as a search space. A different search space is allocated to each terminal. Accordingly, when the DRX is performed, the search space can be restricted. Thus, since it is possible to reduce the number of times the blind determination is performed, the reception power consumption can be reduced.

The search space includes not only the search space for individual terminal but also a common search space monitored by all of the terminals. When the DRX is performed, a sub-frame for which the common search space is not monitored may be provided. Accordingly, when the amount of traffic is relatively small, the DRX is performed, and thus the reception power consumption can be reduced. In this case, since the sub-frames with which a transmission side transmits common information reported in the common search space can be restricted, the sub-frames used for a reception side to monitor the common search space may be said to be restricted. Thus, since it is possible to reduce the number of sub-frames used to monitor the common search space, the reception consumption power can be reduced.

The antenna has been described in the above-described embodiments, but an antenna port may be applied. The antenna port refers to a logical antenna which includes a single physical antenna or a plurality of physical antennas. That is, the antenna port may not necessarily refer to a single physical antenna, but may refer to an array antenna or the like which includes a plurality of antennas. For example, the LTE des not described how many physical antennas configure an antenna port and defines a base station as the minimum unit capable of transmitting different reference signals. Further, the antenna port is defined as the minimum unit which multiplies a weight of a Precoding vector.

Each functional block used to describe the embodiment and each modification is typically implemented by an LSI, which is an integrated circuit. Each functional block may be integrated into one chip, or a portion of or the entire functional block may be integrated into one chip. Here, the LSI is used as the integrated circuit, but the integrated circuit may be called an IC, a system LSI, a super LSI, or an ultra LSI according to the degree of integration.

In addition, a circuit integration method is not limited to LSI, but circuit integration may be implemented by a dedicated circuit or a general-purpose processor. After the LSI circuit is manufactured, a programmable FPGA (Field Programmable Gate Array) or a reconfigurable processor capable of reconfiguring the connection of circuit cells in the LSI circuit or the setting thereof may be used.

When a circuit integration technique capable of replacing LSI appears with the progress of semiconductor technology or other technologies derived from the semiconductor technology, the technique may be used to integrate the functional blocks. For example, biotechnology can be applied.

Although the present invention has been described in detail and with reference to specific embodiments, diverse modifications or corrections may be made by those of skilled in the art without departing from the spirit and scope of the present invention.

This application is based on Japanese Patent Application (Japanese Patent Application No. 2010-104494) filed on Apr. 28, 2010, the disclosure of which is incorporated herein by reference in its entirety.

INDUSTRIAL APPLICABILITY

In the wireless communication apparatus and the wireless communication method according to the invention, it is possible to obtain the advantage of reducing the power consumption without delay of data transmission and reception. Accordingly, the wireless communication apparatus is useful.

REFERENCE SIGNS LIST 100, 300, 500: base station apparatus
101, 301, 501: DRX instruction unit
103, 303, 503: transmission data processing unit
105, 305, 505: PDCCH generation unit
107, 307, 507: transmission signal generation unit
109, 309, 509: scheduling unit
111, 311, 511: transmission unit
113, 201, 313, 513, 601: antenna
115, 315, 515: reception unit
117, 317, 517: reception data processing unit
200, 400, 600: relay station apparatus
203, 403, 603: reception unit
205, 405, 605: monitoring process unit
207, 407, 607: reception data processing unit
209, 409, 609: DRX control unit
213, 413, 613: monitoring process control unit
215, 415, 615: reception data processing unit
217, 417, 617: transmission unit
619: switching control unit

The invention claimed is:

1. A wireless communication apparatus comprising:
a reception unit configured to receive discontinuous reception (DRX) instruction information for the wireless communication apparatus and a monitor process index including a sub-frame index used to monitor a PDCCH for the wireless communication apparatus; and
a monitoring process unit configured to monitor the PDCCH for the wireless communication apparatus using only a sub-frame which is set based on the sub-frame index, when receiving an instruction to perform a DRX process by the DRX instruction information.

2. The wireless communication apparatus according to claim 1, wherein the set sub-frame is a sub-frame distributed in a frame.

3. The wireless communication apparatus according to claim 1, wherein the set sub-frame is set based on the sub-frame index and a sub-frame used for an HARQ process.

4. The wireless communication apparatus according to claim 3, wherein the set sub-frame is set based on the sub-frame index and a sub-frame used for synchronous HARQ process in which a time interval from transmission time of new data to transmission time of retransmission data is fixed.

5. The wireless communication apparatus according to claim 4, wherein when the set sub-frame is not able to be set as a backhaul sub-frame, the monitoring process unit is configured to change the time interval from the transmission time of the new data to the transmission time of the retransmission data and monitors the PDCCH for the wireless communication apparatus.

6. The wireless communication apparatus according to claim 3, wherein when the wireless communication apparatus communicates with a communication partner apparatus using asynchronous HARQ process in which a time interval from transmission time of new data to transmission time of retransmission data is variable within a determined range and when the wireless communication apparatus is instructed to perform the DRX process by the DRX instruction information, the monitoring process unit configured to switch to communication performed using synchronous HARQ process in which a time interval from transmission time of new data to transmission time of retransmission data is fixed and monitors the PDCCH for the wireless communication apparatus.

7. The wireless communication apparatus according to claim 1, wherein when the monitoring process unit detects the PDCCH for the wireless communication apparatus by monitoring continuous sub-frames, the monitoring process unit monitors the PDCCH for the wireless communication apparatus using only a sub-frame corresponding to the detected PDCCH.

8. A relay station apparatus comprising:
the wireless communication apparatus according to claim 1.

9. A wireless communication apparatus comprising:
a scheduling unit configured to perform scheduling on data of a downlink based on discontinuous reception (DRX) instruction information for a communication partner apparatus and a monitor process index including a sub-frame index of the downlink used for the communication partner apparatus to monitor a PDCCH; and
a transmission unit configured to transmit the PDCCH to the communication partner apparatus using only a sub-frame of the downlink based on the DRX instruction information for the communication partner apparatus, the monitor process index, and the scheduling by the scheduling unit.

10. The wireless communication apparatus according to claim 9, wherein when the wireless communication apparatus communicates with the communication partner apparatus using asynchronous HARQ process in which a time interval from transmission time of new data to transmission time of retransmission data is variable within a determined range and when the wireless communication apparatus transmits the retransmission data of the downlink in which an error occurs, the scheduling unit transmits the retransmission data of the downlink after determined sub-frames since the timing of receiving a notification indicating that the error occurs from the communication partner apparatus.

11. A base station apparatus comprising:
the wireless communication apparatus according to claim 9.

12. A wireless communication method comprising:
receiving discontinuous reception (DRX) instruction information for a wireless communication apparatus and a monitor process index including a sub-frame index used to monitor a PDCCH for the wireless communication apparatus; and
monitoring the PDCCH for the wireless communication apparatus using only a sub-frame which is set based on the sub-frame index, when receiving an instruction to perform a DRX process by the DRX instruction information.

13. A wireless communication method comprising:
performing scheduling on data of a downlink based on discontinuous reception (DRX) instruction information for a communication partner apparatus and a monitor process index including a sub-frame index of the downlink used for the communication partner apparatus to monitor a PDCCH; and transmitting the PDCCH to the communication partner apparatus using only a sub-frame of the downlink based on the DRX instruction information, the monitor process index, and the scheduling.

* * * * *